US007336827B2

(12) United States Patent
Geiger et al.

(10) Patent No.: US 7,336,827 B2
(45) Date of Patent: Feb. 26, 2008

(54) SYSTEM, PROCESS AND SOFTWARE ARRANGEMENT FOR RECOGNIZING HANDWRITTEN CHARACTERS

(75) Inventors: Davi Geiger, New York, NY (US); Jong Oh, Sunnyside, NY (US); Mark Pipes, Cambridge, MA (US)

(73) Assignee: New York University, New York, NY (US)

( * ) Notice: Subject to any disclaimer, the term of this patent is extended or adjusted under 35 U.S.C. 154(b) by 636 days.

(21) Appl. No.: 10/416,319

(22) PCT Filed: Nov. 8, 2001

(86) PCT No.: PCT/US01/47925

§ 371 (c)(1),
(2), (4) Date: Jan. 2, 2004

(87) PCT Pub. No.: WO02/37933

PCT Pub. Date: May 16, 2002

(65) Prior Publication Data

US 2006/0050962 A1   Mar. 9, 2006

Related U.S. Application Data

(60) Provisional application No. 60/288,556, filed on May 3, 2001, provisional application No. 60/246,844, filed on Nov. 8, 2000.

(51) Int. Cl.
*G06K 9/18* (2006.01)
(52) U.S. Cl. ............... 382/186; 382/177; 715/541
(58) Field of Classification Search ........... 382/106, 382/112–114, 116, 119, 123, 137, 140, 168, 382/181, 202, 184–189, 203, 209, 215, 231, 382/232, 254, 287, 290, 294, 301, 305, 314, 382/173–179; 706/12, 6; 715/541
See application file for complete search history.

(56) References Cited

U.S. PATENT DOCUMENTS

| | | | | | |
|---|---|---|---|---|---|
| 4,286,255 | A | * | 8/1981 | Siy | 382/123 |
| 5,005,205 | A | * | 4/1991 | Ellozy et al. | 382/187 |
| 5,253,307 | A | * | 10/1993 | Wayner et al. | 382/181 |
| 5,392,363 | A | * | 2/1995 | Fujisaki et al. | 382/187 |
| 5,557,689 | A | * | 9/1996 | Huttenlocher et al. | 382/177 |
| 5,644,656 | A | * | 7/1997 | Akra et al. | 382/215 |
| 5,689,620 | A | * | 11/1997 | Kopec et al. | 706/12 |
| 6,285,786 | B1 | * | 9/2001 | Seni et al. | 382/187 |

\* cited by examiner

*Primary Examiner*—Seyed Azarian
(74) *Attorney, Agent, or Firm*—Dorsey & Whitney LLP

(57) ABSTRACT

A process and system are provided for determining a most likely combination of characters. In particular, character data which includes information indicative of at least one handwritten character is obtained. The character data includes at least one set of segmentation points for the handwritten character. Then, a score can be provided for each particular character of a set of previously stored characters based on a comparison between the character data and the previously stored particular character. In addition, it is possible to compare visual aspects of the handwritten character to visual aspects of each of the previously stored characters for determining likely characters. Also, a Fisher Matching procedure can be used on the character data to ascertain the likely characters. A plurality of handwritten characters can include a first character that is connected to a second character of the handwritten characters via a ligature. A further score of the ligature can be determined based on a starting point of the ligature and an ending point of the ligature. Furthermore, the first character can be connected to the second character via a transition. A particular score of the transition can be ascertained based on a difference in length of the first character and the second character. This particular score can be combined with a score corresponding to the particular handwritten characters.

118 Claims, 20 Drawing Sheets

FIGURE 10
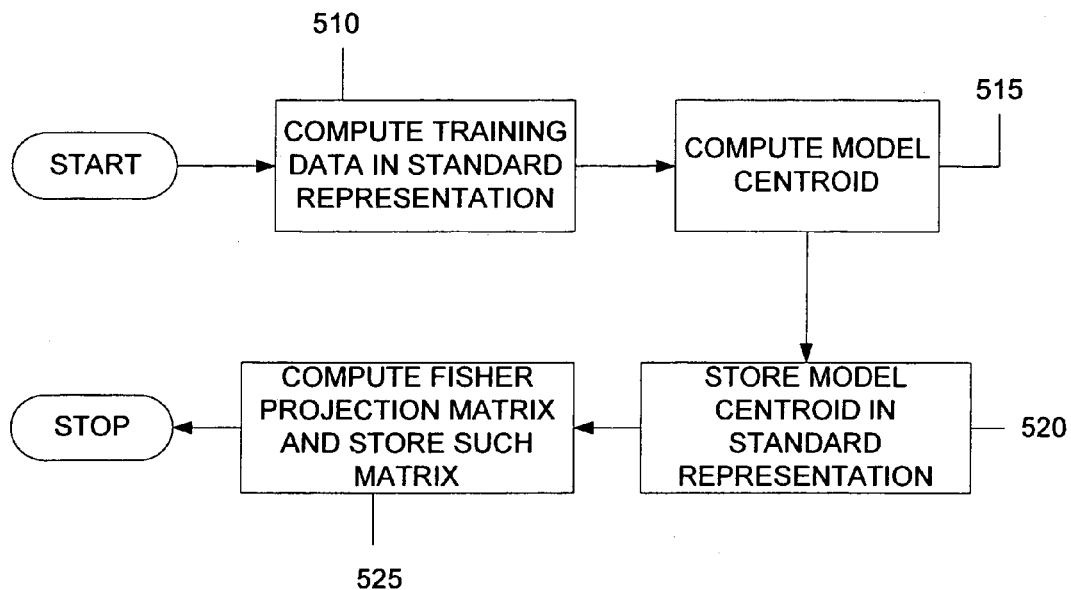
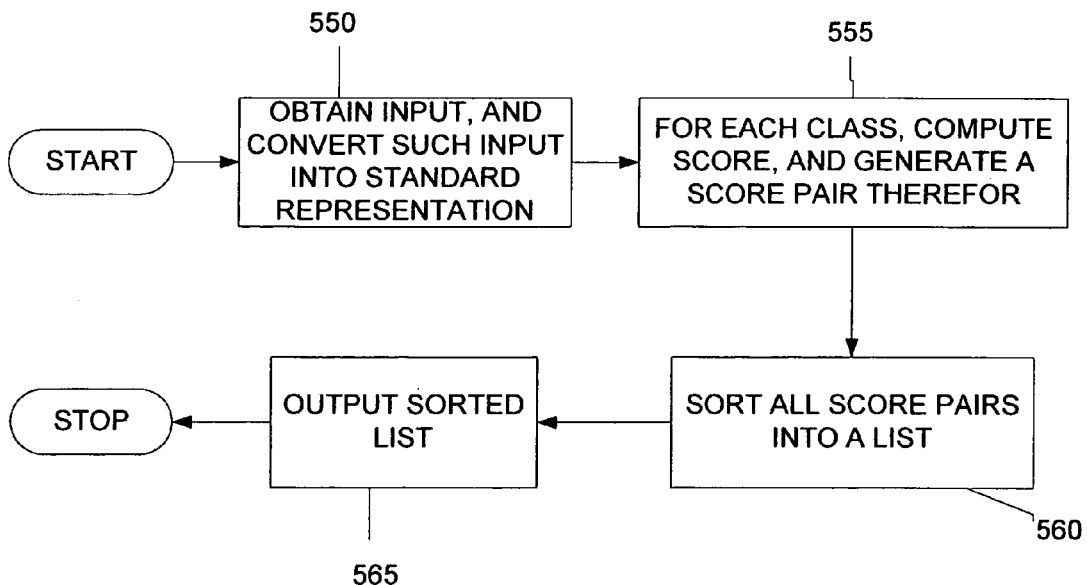
FIGURE 11

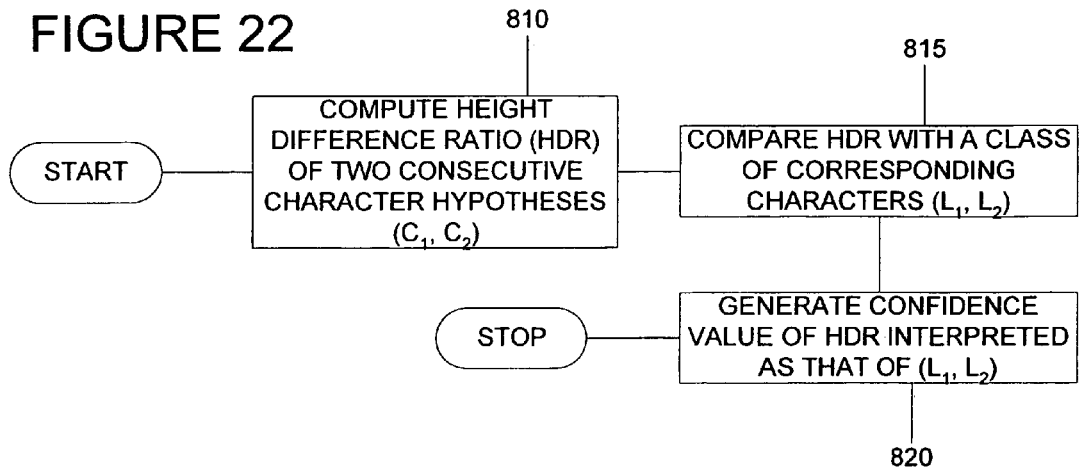
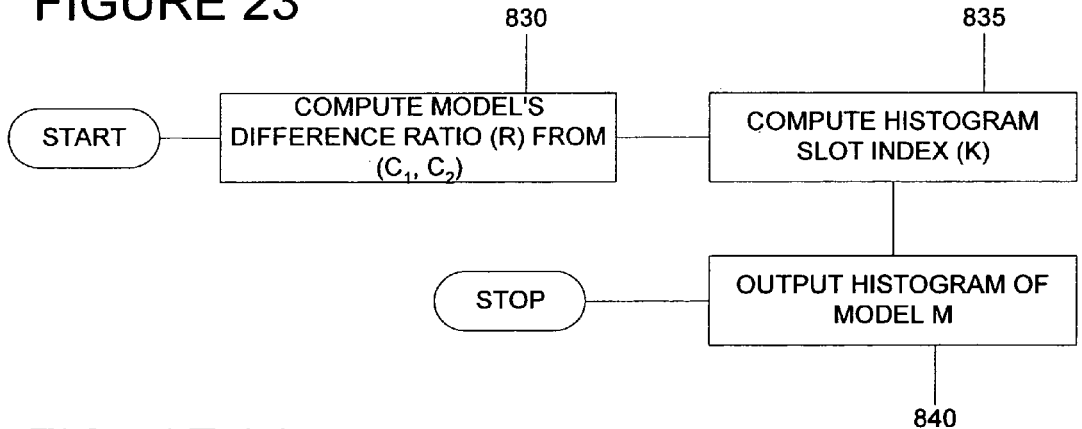
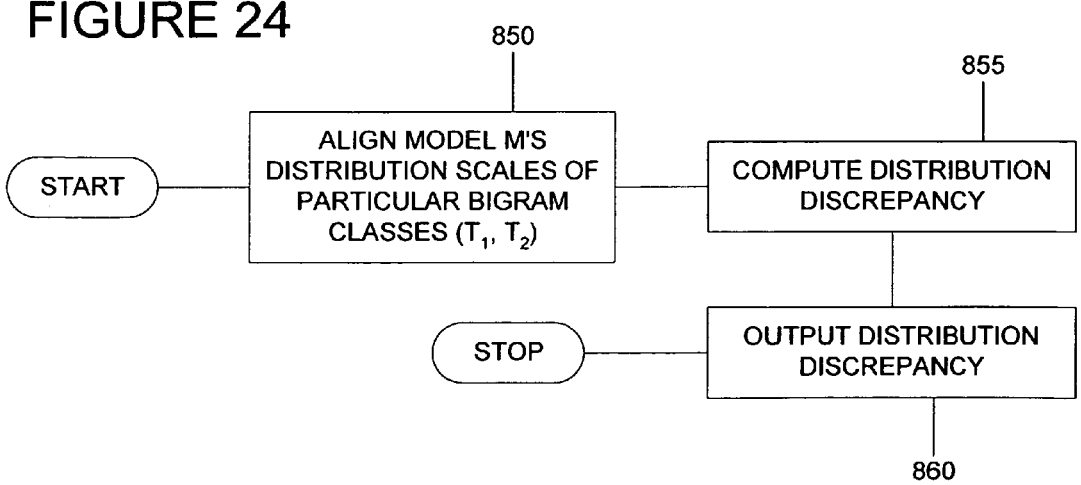

SYSTEM, PROCESS AND SOFTWARE ARRANGEMENT FOR RECOGNIZING HANDWRITTEN CHARACTERS

CROSS-REFERENCE TO RELATED APPLICATIONS

This application is a national stage application of PCT Application No. PCT/US01/47925 which was filed on Nov. 8, 2001 and published on May 16, 2002 as International Publication No. WO 02/37993 (the "International Application"). This application claims priority from the International Application pursuant to 35 U.S.C. § 365. The present application also claims priority under 35 U.S.C. § 119 from U.S. Patent Application Ser. Nos. 60/246,844 and 60/288,556, filed on Nov. 8, 2000 and May 3, 2001, respectively. The entire disclosures of these applications are incorporated herein by reference.

BACKGROUND OF THE INVENTION

1. Field of the Invention

The present invention relates to a system, process and software arrangement for recognizing handwritten characters, and more particularly to recognizing the handwritten characters on-line using, e.g., character segmentation techniques.

2. Background Information

Currently, technologies such as microcomputers, word processors, fax machines and electronic mails utilize electronic handwriting recording and recognition techniques to enable a useful and versatile communication between such devices. In particular, conventional computer-based handwriting analysis methods include a recognition and interpretation of characters, as well as a verification of the handwritten data.

The known electronic handwriting recognition procedures generally transcribe a message, represented in a spatial form of graphical marks, into a computer text, e.g., into a sequence of 8-bit ASCII characters. These handwriting interpretation techniques generally determine the most likely meaning of a particular handwritten text, e.g., a mailing address written on an envelope. The handwriting verification techniques are used to determine whether the handwritten text belongs to a particular individual, and can be used in, e.g., the forensic investigations.

The handwriting recognition techniques can be considered as being in two separate categories—on-line recognition and off-line recognition.

The on-line handwriting recognition techniques are generally used with a transducer/input device is connected to a computer which is available to the user. One such arrangement is shown in FIG. 1, which illustrates an on-line handwriting recognition system 5 that can also be used with conventional techniques and techniques according to the present invention. The transducer/input device converts the user's writing motion into a sequence of signals, and sends this signal information to a computer 50. The computer 50 generally includes a handwriting recognition system. An exemplary transducer can be a tablet digitizer 10. This tablet digitizer 10 generally includes a plastic or electronic pen 15 and a pressure or electrostatic-sensitive writing surface 20 on which the user provides the handwritten information using the pen 15. By sampling or tracking the movement of a tip of the pen 15 on the writing surface 20, the tablet digitizer 10 is able to detect certain information when the pen 15 is in contact with the writing surface 20 e.g., the x and y coordinates of a sampled point on the writing surface 20, providing information indicative of whether the pen 15 touches the writing surface 20 ("pen-down state" or has been removed therefrom—"pen-up state", etc.). The information is transmitted to the connected computer 50 for recognition processing by the handwriting recognition system. A "stroke" in the data in the "on-line" recognition system can be defined as a sequence of sampled points from the pen-down state to the pen-up state of the pen 15. Thus, the completed writing of a word would likely consist of a sequence of one or more strokes. The tablet digitizer 10 then captures the temporal (dynamic) data of the word when it samples the points on the contours that the user is forming.

The off-line handwriting recognition techniques are generally related to the field of Optical Character Recognition ("OCR"). In contrast to the on-line handwriting recognition techniques, these off-line techniques are not interactive. In the exemplary OCR system, a machine-printed material is scanned into a computer file in two-dimensional image representation using a scanner. Then, the off-line handwriting recognition technique of this conventional OCR system attempts to recognize the scanned handwritten data.

One of the benefits of the on-line handwriting recognition techniques which set them apart from the off-line handwriting OCR or other image recognition techniques is their ability to utilize the temporal and dynamic input sequence information which is provided directly by the user in real-time. This dynamic information obtained by the on-line handwriting recognition techniques provides a vivid separation of the foreground from the background, and thus can bypass the pre-processing procedures that are required to be performed by the off-line handwriting recognition techniques. Also, the obtained on-line dynamic information is generally more compact than the off-line information because of the different dimensionalities in representation. The difference in the data size also leads to the difference in the processing time.

Another advantage of the on-line handwriting recognition techniques is their use of the sequence information of the data received thereby which allows the character boundary segmentation easier to be performed. After the preprocessing stage, most handwriting recognition systems and methods attempt to separate their received data into intervals/segments (which correspond to hypothetical characters), and apply an evaluation process to such intervals/segments. The recognition performance of such system and process is substantially dependent on the quality and robustness of the character segmentation. Due to the cues available from the temporal ordering of its input data, the on-line handwriting recognizer may generate the segmentations in a reliable and efficient manner. For example, when the two neighboring characters overlap in the respective occupying regions, it is significantly more difficult for an off-line recognition system and method to segment such characters correctly. This is because any simple geometric separation would likely contain a portion of at least one of the characters. Using the on-line handwriting recognition system, it would be easier to handle the above-described scenario.

As known to those having ordinary skill in the art, the handwriting recognition systems (whether on-line or off-line) are designed to support three different styles, i.e., a printed style, a cursive style and a mixed style. Recognizing the printed style of handwriting is, most likely, simpler than recognizing other handwriting styles. This is because each character of such style has clearer boundaries with its neighboring characters. For example, the characters in the printed style are usually separated by the "pen-up" signal in the on-line handwriting recognition system. In recognizing the cursive handwritten script, however, most of the component characters are connected to their neighbors by a sub-stroke (i.e., a "ligature") which is not a part of any character or letter, but only a connecting pattern between two characters/letters. In this situation, it is more difficult to hypothesize about the character segmentation since there is less information regarding the likely segmentation boundaries of each character. Handwritings having a printed style can be regarded as a subset of the cursive mode recognition, and the mixed mode can be obtained as a by-product of obtaining both printed and cursive modes support. Therefore, one having ordinary skill in the art would understand that it is the hardest task to recognize characters in the cursive mode.

Conventional handwriting recognition systems and methods can be writer-independent or writer-dependent. For example, writer-independent systems can handle the idiosyncrasies of user's writing styles, and writer-dependent systems are trained to recognize a single user's writing style. It is possible to have the same character (or a class of character) written in different ways, e.g., so that they are in different subclasses or allographs. Therefore, each character class usually consists of one or more subclasses. Correctly identifying a good set of allographs is a challenging task which requires a recording of a huge number of samples, which usually cannot be done by the conventional systems and methods. Also, a larger number of subclasses/allographs would require additional time for processing for such conventional systems which would not be preferable, especially when using an on-line character recognition system or method.

SUMMARY OF THE INVENTION

Various embodiments of a process and system according to the present invention overcome the above-described deficiencies of the conventional systems and methods.

In particular, a process and system are provided which determine the most likely combination of characters. In particular, character data which includes information indicative of at least one handwritten character is obtained, which is preferably on-line data or real-time data. The character data includes at least one set of segmentation points for the handwritten character. Then, a score can be determined for each particular character of a set of previously stored characters based on a comparison between the character data and the respective particular character.

In addition, it is possible to generate the character data after a user completes entering handwritten characters on an input device. The character data may correspond to a handwritten word. Also, the score can be provided for each of the previously stored characters by analyzing a predetermined number of the segmentation points of the character data. The character data may be generated when the user disconnects a writing instrument from the input device. The character data can also include cursive data corresponding to at least one handwritten cursive character, and script data corresponding to at least one handwritten script character.

According to another embodiment of the present invention, the score for each of the previously stored characters can be recorded at predetermined time intervals. The score for a current previously stored character may be based on previous scores of a word path associated with the current previously stored character. This score can preferably be the average of the total scores for the previously stored characters corresponding to the word path which includes the score for the current previously-stored character. The word path can be removed from being considered to be the most likely combination of characters. Also, the word path preferably corresponds to a characters sequence of the certain characters. A determination can also be made as to whether the character sequence is to be filtered out based on the score associated with the word path of the character sequence. This determination is preferably made based on a total number of the character sequences.

In yet another embodiment of the present invention, the score can be normalized, and the normalized score may be stored in a storage arrangement. The character data may also correspond to a sequence of handwritten characters, and it is possible to determine whether the sequence exists in a dictionary. This determination regarding the existence of the sequence may be performed for each of the sequences of a plurality of handwritten characters at predetermined time intervals. Also, the dictionary may have a tree-type structure, and the determination regarding the existence of the sequence can be performed by evaluating whether every character of the sequence is provided at a particular node of this tree-type structure of the dictionary. The sequence can be removed from consideration as being the most likely combination of characters if the sequence is not in the dictionary. In addition, the score for the sequence can be lowered and/or unchanged if the sequence is not in the dictionary.

In still another embodiment of the present invention, a first character of the handwritten characters is connected to a second character of the handwritten characters via a ligature, and a further score of the ligature is determined based on a starting and ending points of the ligature. This further score may be combined with the score corresponding to the previously stored characters so as to form a combined score.

According to another embodiment of the present invention, a vector corresponding to each of the handwritten characters can be assigned, and a comparison of each of the vectors can be made to vectors corresponding to the previously-stored characters. This comparison can be performed by applying a Fisher technique to the vectors corresponding to the handwritten characters. The vectors corresponding to the handwritten characters can preferably be compared to a cluster of vectors corresponding to the previously stored characters. This comparison of the vectors may be performed by measuring a Euclidean distance from the vector corresponding to the handwritten characters to each of the clusters. The Euclidean distance can be measured from a center of each of the clusters.

According to still another embodiment of the present invention, a first character of the handwritten characters may be connected to a second character of the handwritten characters via a transition. A further score of the transition can also be determined based on a difference in length of the first character and the second character, and the further score combined with the score corresponding to the particular characters to form a combined score. This further score is preferably determined based on a height difference ratio ($M_H$), a top difference ratio ($M_T$) and a bottom difference ratio ($M_B$) of the first and the second characters.

Each of the previously stored handwritten characters may be assigned to at least one of three classes of characters based on vertical extension dimensions thereof. A first class of the three classes may include first characters which extend beyond a predetermined top position, a second class of the three class includes second characters which extend below a predetermined bottom position, and a third class of the three classes includes third characters which do not extend above the predetermined top position or below the predetermined bottom position. The above-referenced further score (VBScore) can be determined according to the following equation:

$$VBScore(<c_1,c_2>)=k_H \cdot M_H(<c_1,c_2>)+k_T \cdot M_T(<c_1,c_2>)+ k_B \cdot M_B(<c_1,c_2>),$$

where $c_1$ is the first character, $c_2$ is the second character, $k_H$ is a height position coefficient, $k_T$ is a top position coefficient and $k_B$ is a bottom position coefficient. The height, top and bottom position coefficients can preferably be estimated, and may be the same for each pair of the three classes. A histogram can be generated for each pair of the three classes, and the height, top and/or bottom position coefficients may be estimated based on such histograms.

According to yet another embodiment of the present invention, the particular character can be segmented to produce a plurality of segmentation points for the character data. It is possible to insert a further segmentation point on the respective segment between two neighboring segmentation points if the Euclidean distance between two such neighboring segmentation points is this distance greater than a predetermined threshold. Also, the segment is preferably established between two neighboring segmentation points of each pair of the plurality of segmentation points, and a predetermined code is assigned to each of the segments using a previously stored list of codes. This predetermined code can be assigned to each respective segment based on a similarity of a curvature of the respective segment and a list of previously stored extensions. Furthermore, each respective segment is normalized to be comparable with the previously stored extensions.

BRIEF DESCRIPTION OF THE DRAWINGS

For a more complete understanding of the present invention and its advantages, reference is now made to the following description, taken in conjunction with the accompanying drawings, in which:

FIG. 10 is a high-level flow diagram of an exemplary technique for training handwritten character data vectors according to an exemplary embodiment of the present invention;

FIG. 11 is a high-level flow diagram of an exemplary technique for recognizing handwritten characters according to an exemplary embodiment of the present invention;

FIG. 22 is a flow diagram for a process to compute a height difference ratio according to an exemplary embodiment of the present invention;

FIG. 23 is a flow diagram for a process to compute a histogram score of a model according to an exemplary embodiment of the present invention; and FIG. 24 is a flow diagram for a process to compute a distribution discrepancy of two bigram classes according to an exemplary embodiment of the present invention.

DETAILED DESCRIPTION

Overview of Exemplary Embodiments of System and Process

Figure 1:
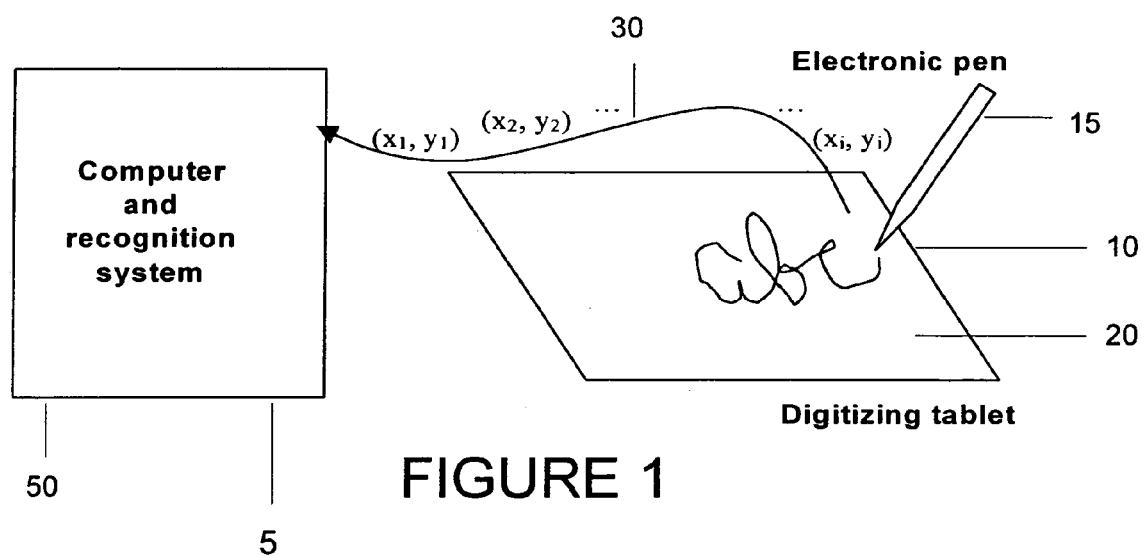
FIG. 1 is an exemplary embodiment of an on-line handwriting recognition system which can be used with conventional techniques and advantageous techniques according to the present invention.
Figure 2:
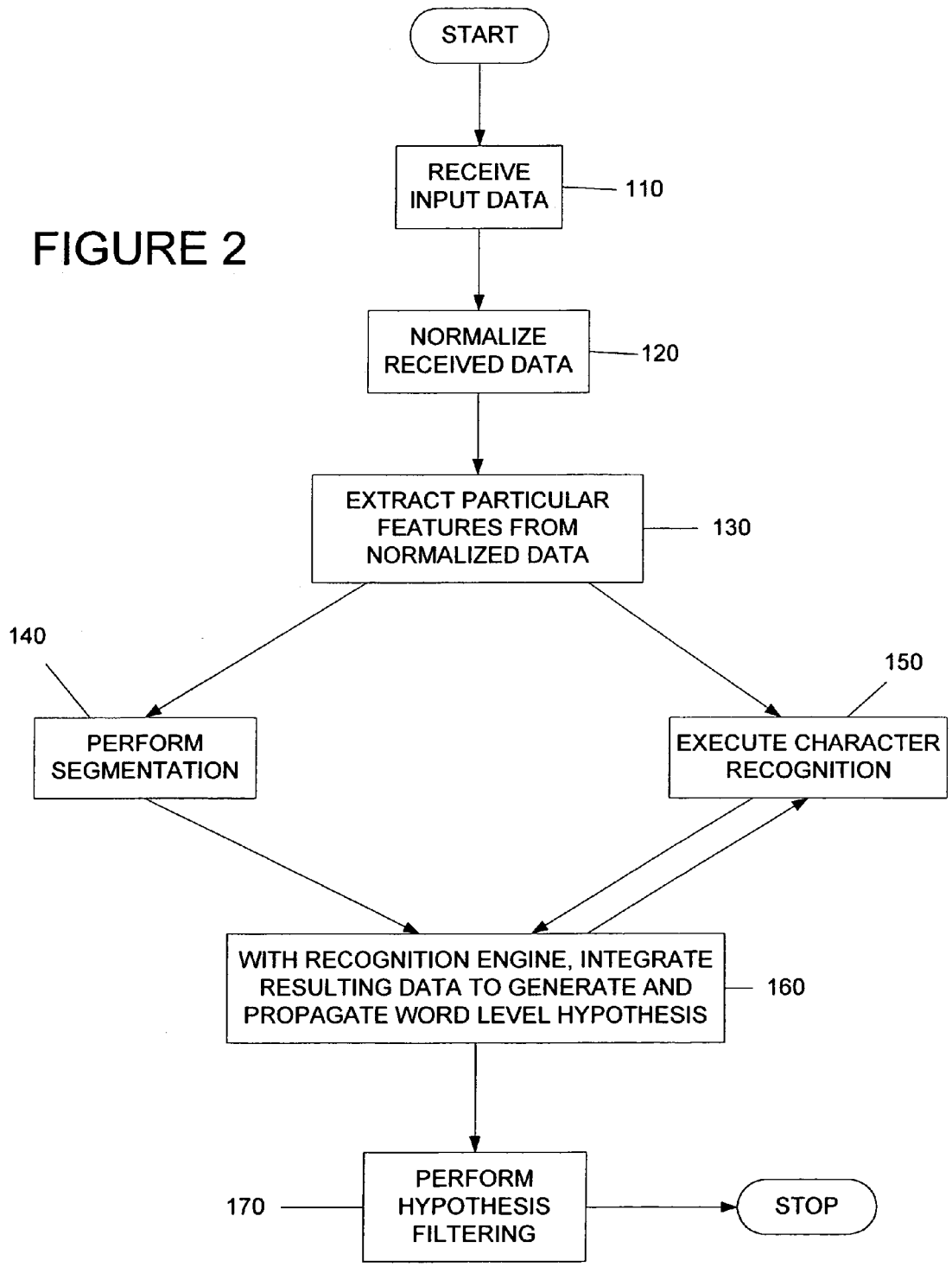
FIG. 2 is a high-level block diagram of an exemplary process for recognizing handwritten characters according to the present invention.

FIG. 2 illustrates an exemplary embodiment of a technique for recognizing handwritings according to the present invention, which can be used by the system of FIG. 1. In this exemplary embodiment, input data can be received by the handwriting recognition system 50 (step 110). This input data preferably includes coordinate information (i.e., x, y) and time information for the handwritten characters produced by the user using the pen 15 on the pad 20. The input data is normalized in step 120. The normalization procedure may include noise suppression and regularization of the input data's variability (e.g., size, translation, rotation, etc.). Then, in step 130, the target features are computed by a feature extraction technique, which plugs these features into an internal representation or previously-stored handwritten characters of the system 50. The plugged features are forwarded to a segmentation module in step 140 to generate a hypothetical character. In addition, a component character recognition module preferably evaluates a particular segmentation to assign, e.g., class-labeled scores to hypotheses derived by the system 50 (step 150). Thereafter, the resultant data is forwarded to a handwriting recognition engine. In particular, this handwriting recognition engine integrates various information received from other modules and engines of the system 50 to generate and propagate word level hypotheses (step 160). Thereafter, the hypotheses filtering technique can be used in step 170 to improve the accuracy and accelerate the recognition performance by, e.g., controlling the search which is being performed by the handwriting recognition system 50. Preferably, the handwriting recognition system 50 can generate a large number of the hypotheses, so that the filtering technique may apply pre-arranged models to eliminate or rearrange the "worthiness" of the hypotheses. It should be understood that the segmentation module according to an exemplary embodiment of the present invention can be a "stand-alone" module or may be merged with the handwriting recognition system 50. It is also possible for the character recognizer module of the handwriting character system 50 to communicate with a feature extraction module each time the character recognizer module is evoked by the system 50.

In the exemplary embodiment of the present invention, the sampling rate of the user's writing used by the tablet digitizer 10 can be, e.g., at least 100 Hz (i.e., one hundred points per second). However, it should be understood that using other sampling rates is conceivable, and clearly within the scope of the present invention. In addition, the tablet digitizer 10 provides "pen-down" and "pen-up" signals indicating when the user contacts the pen 15 to the tablet surface 10, and when the user removes it therefrom, respectively. This information can be used to determine the start and the end of the stroke and may provide other information (e.g., the data regarding a sequence of strokes). According to another embodiment of the present invention, it is also conceivable to obtain other data, such as the pressure on the tablet surface 20 and the tilt of the pen 15, as well as the speed of the pen movement. The point coordinates provided by the tablet digitizer 10 can be integer or decimal values in reference to the origin of the tablet surface 20's coordinate system.

Figure 3:
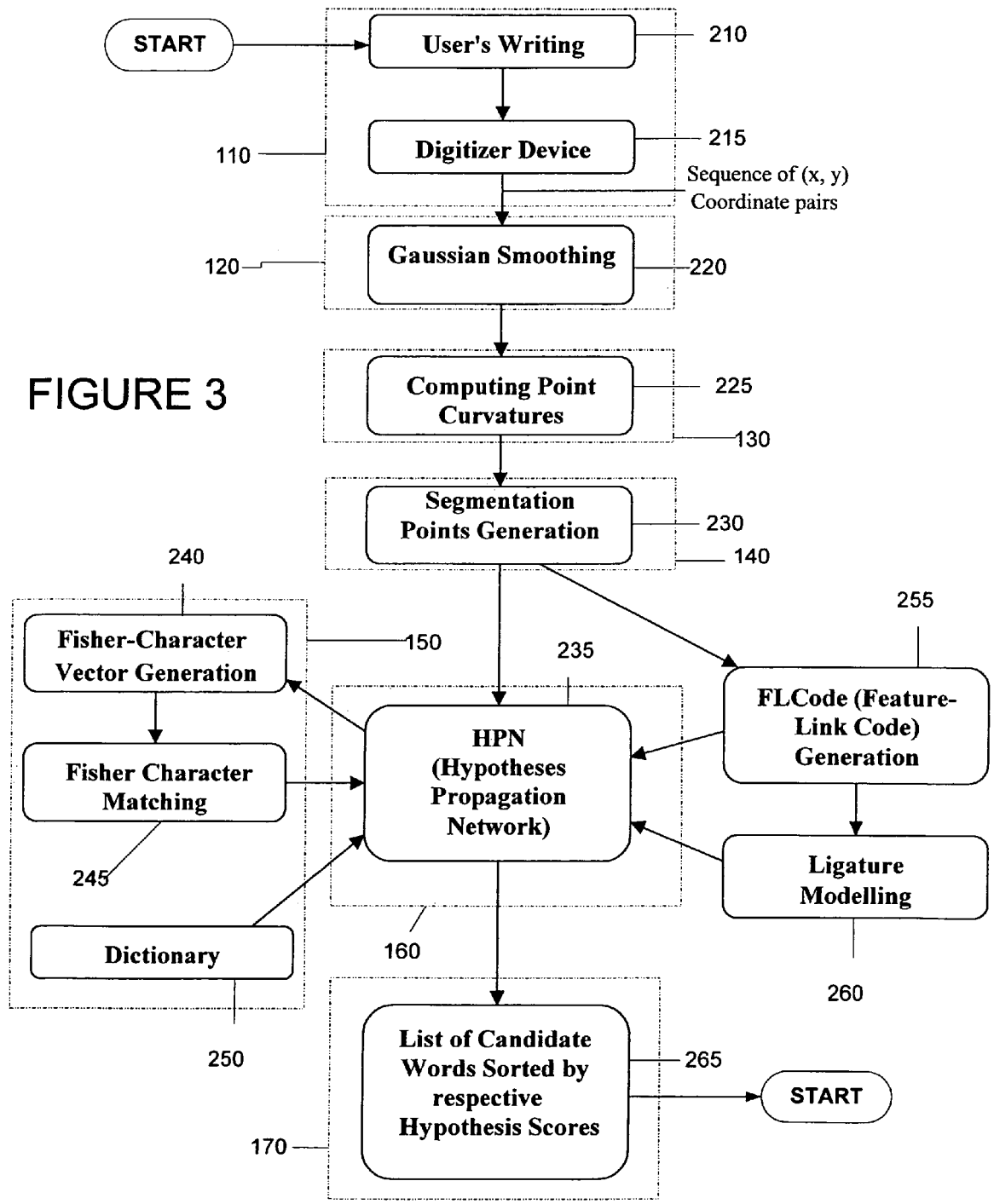
FIG. 3 is a flow diagram of another exemplary embodiment of the process for recognizing handwritten characters according to the present invention.

FIG. 3 shows a flow diagram of another exemplary embodiment of the process for the handwriting recognition according to the present invention, which can also be used with the handwriting recognition system 50 of FIG. 1. It should be noted that the steps of FIG. 3 illustrate additional details to (and alternative techniques for) the process described above with reference to FIG. 2. As provided above, the sequence of (x, y) coordinate pairs is obtained from the tablet digitizer 10 in step 210, which forwards this information to the handwriting recognition system 50. This occurs, in real-time, as the user writes on the tablet surface 20 with the input device (e.g., the pen 15) to generate the input data, which is sampled by the tablet digitizer 10 (step 215). Steps 210 and 215 may be substantially similar to step 110 of FIG. 2. The points represented by the coordinates are provided from the contour formed by the user's writing on the tablet surface 20.

In most circumstances, the digital handwritten "ink" entered on the tablet surface 20, when magnified, has jagged lines. Noises can originate from the digitizing process, hardware error, or erratic hand motion and pen-down indication which limit the accuracy of the tablet digitizer 10. The same handwritten characters or words entered by different users can vary greatly in size, shape and distortion. Even the same user may write in substantially different ways depending on situations or over time. Thus, in order to suppress various noises and reduce the variability in the raw handwritten data for easier and standardized processing, the handwriting recognition system according to the present invention preferably receives a list of point coordinates (or sequences of coordinate pairs) from the tablet digitizer 10. Then, the handwriting recognition system subjects the received coordinates to a normalization technique, such as Gaussian Smoothing process (step 220). Thereafter, in step 225 (which is substantially similar to step 130 of FIG. 2), the handwriting recognition system of the present invention can determine curvature information of each point on the stroke contour or segment of the input data using the normalized or smoothed coordinates.

Thereafter, the generation of segmentation points is initiated in step 230, which is similar to the step 140 of FIG. 2. The segmentation points are candidate points that indicate if a character stroke has began or ended within a handwritten word. In particular, these segmentation points are candidates for segmenting or breaking a word into different characters. In one exemplary embodiment of the present invention, the segmentation points which have a curvature value larger than a predetermined or selected threshold value may be selected into the set of candidates for the segmentation points.

In step 235, a Hypotheses Propagation Network ("HPN") of the exemplary embodiment of the system according to the present invention receives the handwritten input data and the corresponding segmentation points, and uses this information to generate sets of hypothesis for each of the received segmentation points to obtain the resultant list of hypotheses of words. The HPN uses techniques which may be substantially similar to those of step 170 of FIG. 2. Also, the HPN preferably utilizes certain character training and recognition techniques to effectively generate accurate handwriting word recognition results. In particular, the system and process of the present invention can use Fisher Normalization and Vector Generation techniques on the handwritten characters, thereby training the system and process of the present invention with different variations of the same handwritten characters (step 240). Thereafter, in step 245, the Fisher character matching technique is executed on the handwritten data to obtain the best matches for such data based on the Fisher-trained character data. In addition, it is possible to utilize a lexicon or a dictionary of permissible words to filter the combination of characters which are most unlikely to be able to form a word. This can be accomplished by matching the set of possible combination of the handwritten words to a tree-type structure of the dictionary (step 250).

Next, in step 255, the system and process according to the present invention preferably uses a hypothesis generator to determine the characteristics and the curves of two segmentation points in a given handwritten word (or character), which can be used to compute a Feature Link Code ("FLC"). The FLC can be a non-negative integer which is based on the characteristics of predetermined curvature characteristics. The type of an interval between two segmentation points is then computed in terms of the FLCs. Further, in step 260, a ligature modeling procedure is executed. In particular, a ligature can be defined as a part of a stroke, which does not belong to any characters. Instead, it can be identified as a connector between the characters in a cursive-type writing. By appropriately modeling away the ligatures in the input handwritten data, additional regularity in the character recognition by the HPN can be established. Finally, in step 265 (which can correspond to step 170 of FIG. 2), the list of the candidate words generated by the HPN can be sorted according to their respective hypothesis scores. Then, the HPN combines the "best" entries into a single sorted list that is the list of candidate words hypothesized by the system of the present invention. Generally, the top ranking word in the list would be the final output of this exemplary embodiment of the system and process according to the present invention.

Provided below are further details of the steps and techniques of the system and process of the present invention that were referred to be above.

Details of Normalization Techniques

Gaussian Smoothing

As known to those having ordinary skill in the art, a smoothing procedure is the technique used to suppress a quantization noise of point sampling, which also averages an input point with its neighboring points based on a predetermined weighting scheme. In the exemplary embodiment of the system and process of the present invention, the smoothing procedure can be utilized to, e.g., obtain more finegrained real number coordinates (instead of the integer numbers in the raw data) so that the point curvatures can be reliably determined. It is preferable to compute the point curvatures accurately and reliably. This task can be accomplished using Gaussian distributions controlled by the size of the window ($\rho$) and the spread ($\sigma$) of the distribution (step 120 of FIG. 2 and step 220 of FIG. 3). For a contour C=<$p_1$, $p_2$, ... $p_n$>, the Gaussian smoothing of the contour C transforms it to a transformed contour C'=<$p_1$, $p_2$, ... $p_n$> where $$p_i = (x_i, y_i), \quad p'_i = (x'_i, y'_i)$$

$$x'_i = \frac{\sum_{j=-\rho}^{j=\rho} x_{i+j} \cdot G(j)}{\sum_{j=-\rho}^{j=\rho} G(j)}, \quad y'_i = \frac{\sum_{j=-\rho}^{j=\rho} y_{i+j} \cdot G(j)}{\sum_{j=-\rho}^{j=\rho} G(j)}$$

and the Gaussian mask G(k) can be defined as $$G(k) = \exp\left(\frac{-k^2}{2 \cdot \sigma^2}\right), \quad \text{for } k = -\rho \text{ to } k\rho.$$

Global and Local Filtering

Filtering technique can eliminate duplicate handwritten data points, and normalize the irregularity in a data point density that may be caused by the relative speed of the user handwriting. For example, in the handwriting recognition systems, when the handwriting speed is slower in a particular interval, it would likely contain more points in such interval. It follows that when the writing speed is faster, the interval would likely possess sparser distribution of the points. A conventional technique for executing such filtering procedure is called "equidistant re-sampling" procedure, which forces a minimum Euclidean distance between two data points. The results of this prior art procedure likely provides approximately equidistant data points. In the fast handwriting interval, there may be a smaller number of data points, and an interpolation technique may be used to fill the gaps between these points. Conventionally, this filtering procedure can be performed at a global level as part of the data acquisition process.

In the exemplary embodiment of the system and process according to the present invention, two level filtering (i.e., global and local level filtering) procedures can be employed. The global level filtering procedure operates in substantially the same manner as the conventional filtering techniques. Moreover, the local level filtering uses a handwriting character hypothesis interval as the input data. This character hypothesis interval is a sequence of points contained in one or more consecutive sub-strokes which is used because a character may span across several strokes, with the starting and ending portions possibly covering partial strokes.

Figures 4A, 4B:
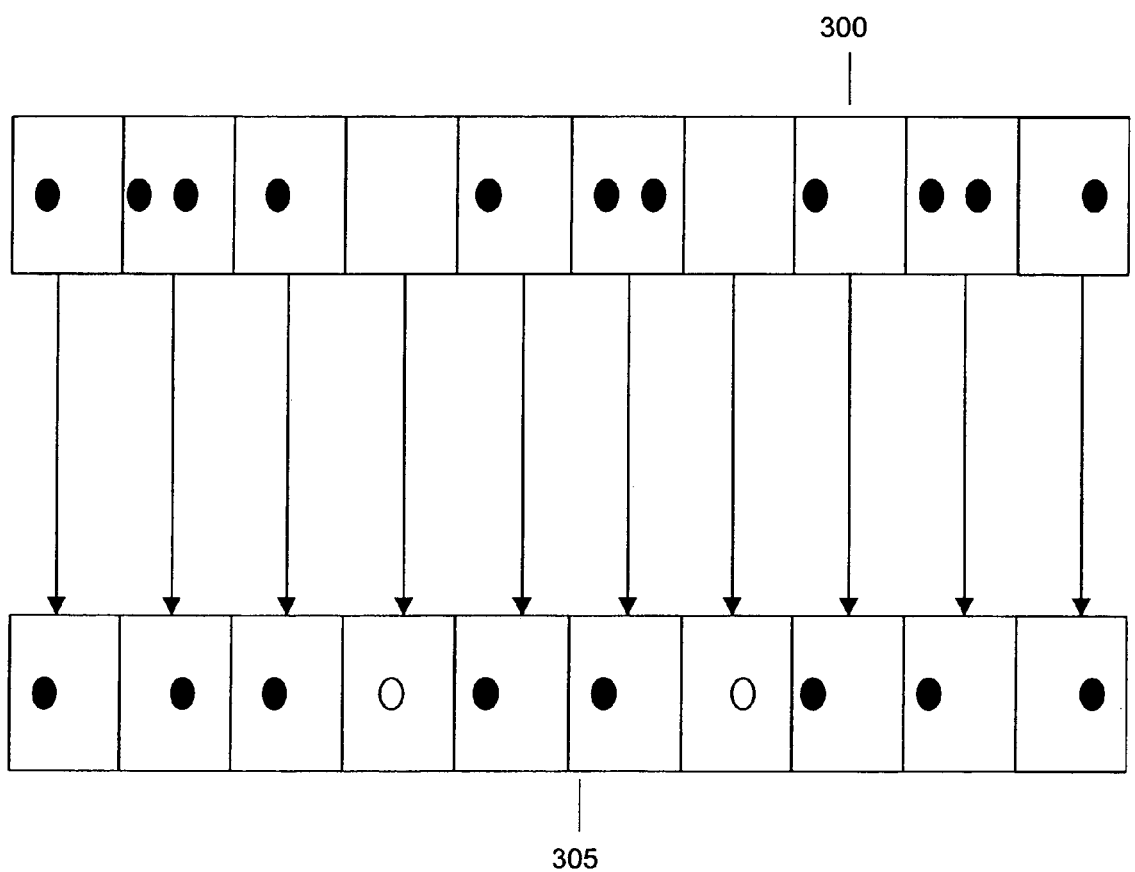
FIG. 4A is an illustration of the original distribution of interval segmentation points in an exemplary handwriting.
FIG. 4B is an illustration of a resultant distribution of the interval points of FIG. 4A after being subjected to a local filtering technique of the present invention.

As shown in FIG. 6A, the character segmentation procedure utilized by the exemplary embodiment of the system and process according to the present invention generates a set of proposed segmentation points 300 based on the curvatures. In order to determine the appropriate interval between the two segmentation points for attempting to determine the hypothetical character, the local level filtering procedure is performed on the target interval. The re-sampling size of the local level filtering is maintained as a constant, and the spacing between two re-sampled segmentation points is preferably dependent on the arc/curvature length of the particular interval. Thus, the local level filtering generates, as an output, a fixed size sequence of points. This is done regardless of how many points the input interval has, nor does it depend on the length of the interval (in terms of arc/curvature length). FIG. 4B shows an exemplary output 305 of the local level filtering procedure according to the present invention, which was based on the input of the segmentation point 300 illustrated in FIG. 4A. Because the size of the interval can vary significantly (from the minimum to the maximum sizes), it is possible for the input interval to contain less points than those in the re-sampled size. In such case, an equidistant interpolation is performed to make up for the missing points by adding additional points between the starting and ending points of the arc curvature.

Translation and Scale Normalization

It should be understood that the coordinate representation of the raw input data is generally not translation-invariant. To achieve the invariance of the coordinate values, it is preferable to recompute the point positions with reference to a new standard origin. The determination as to what origin is assigned as the standard is facilitated by ascertaining whether the system and process of the present invention can hypothesize the definite boundaries of the characters. At that point, it is possible to use a fixed boundary point as the origin. Depending on the segmentation methodology being used, however, this information may not be available.

According to the exemplary embodiment of the present invention, it is possible to compute the graphical bounding box of a writing interval hypothesized by the recognition module as being a possible character, because the interval has predetermined starting and ending points. The lower left corner of the interval (of the particular handwriting character or word) can be selected as a new origin, and the coordinates therefore are recomputed with reference thereto. In particular, with the interval of coordinate pairs being $I=<(x_1,y_1), (x_2,y_2), \ldots, (x_n,y_n),>$, the new origin can be $O=(x',y')$, where $x'=\min\{x_i x_i\}$ and $y'=\min\{y_i\}$, $i=1 \ldots n$. Then, the translation invariant version of the interval becomes $$I'=<(x_1-x',y_1-y'), (x_2-x',y_2-y'), \ldots, (x_n-x',y_n-y'), >.$$

It is preferable to reduce the size variability of the target objects, which can be applied for each character or for the entire word. The size normalization in the system and process of the present invention is preferably applied at the character level, which utilizes the local level filtering procedure described above. The output S of the local level filtering procedure applied to the character can preferably be a fixed length sequence of re-sampled points. After the translation normalization technique is applied to the output S, this output S is converted as follows:

$$S'=<(x_1,y_1), (x_2,y_2), \ldots, (x_n,y_n)>.$$

Thereafter, the converted output S' can be transformed into an Expanded Coordinate Vector ("ECV") by expanding the point coordinate pairs into a vector form, as follows:

$$ECV(S')=V=<x_1, y_1, x_2, y_2, \ldots, x_n, y_n>.$$

The Extended Coordinate Vector V can then be applied to the vector magnitude normalization to become a normalized vector magnitude representation U such that $|U|=1$. In particular, the normalized vector magnitude representation $U=V/|V|$, where U can also be referred to as a translation and scale invariant representation of the input character interval. The vector generation shall be discussed in further detail below.

Feature Extraction and Representation

After the handwritten data is normalized in step 130 of FIG. 2, it is preferable to obtain or extract prominent information from the normalized data, and represent it in a standard form to be used by the exemplary embodiment of the system and process of the present invention for recognizing handwritten data (step 140 of FIG. 2). In particular, the exemplary embodiment of the system and process of the present invention determines local geometric features of the handwritten data (e.g., the point curvatures and the point tangent angles of such data). Initially, the tangent angle at each point of the handwriting is determined, which is approximated as the direction angle from the current point to the next point. As an example, for two consecutive points $p_i=(x_i,y_i)$ and $p_{i+1}=(x_{i+1},y_{i+1})$, the tangent angle $\theta_i$ of $p_i$ is $$\theta_i = \operatorname{acos}\left(\frac{x_i - x_{i+1}}{dist(p_i, p_{i+1})}\right)$$

where $dist(p_i, p_{i+1})$ is the Euclidean distance between points $p_i, p_{i+1}$. The curvature $k_i$ at point $p_i$ is approximated as the amount of the direction angle change around point $p_i$.

Thus, the curvature $k_i$ is computed as the absolute amount of the angle change from $\theta_{i-1}$ to $\theta_i$, multiplied by a plus or minus sign. The plus would be utilized if the angle change is clockwise, and the minus would be utilized if the angle change is counter-clockwise. Along with the curvature $k_i$ of point $p_i$ (i.e., $x_i$, $y_i$), it is also possible to determine the arc-length of the sub-stroke starting from a point $p_0$, which is the first point of the stroke, and ending at point $p_i$. This can be computed incrementally by adding the Euclidean distance between points $p_{i-1}$ and $p_i$ to the sub-stroke up to $p_{i-}$.

Character Segmentation

The exemplary embodiment of the system and method of the present invention then segment the handwritten data into segments, e.g., corresponding to individual characters (step 140 of FIG. 2 and step 230 of FIG. 3).

Segmentation Point Generation

Figures 5A, 5B:
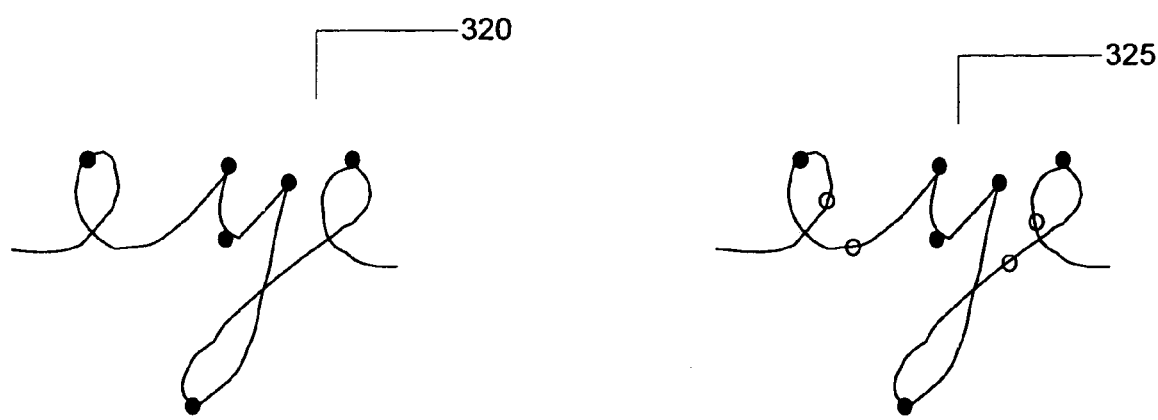
FIG. 5A is an exemplary illustration of a cursively-written word "eye" with only high-curvature points provided therein, according to a particular embodiment of the present invention.
FIG. 5B is an exemplary illustration of the cursively-written word "eye" with the high-curvature points and augmentation points provided therein, according to the present invention.

The generation of the candidate segmentation points according to the exemplary embodiment of the present invention can be based on the detection of high curvature points. This is because the high curvature points (e.g., corner-points or turning-points) of a particular segment are the locations where the information regarding the dynamics and geometry of the particular handwritten data is most condensed, thus providing better information for the character boundaries. An exemplary illustration of the word "eye" 320 having the set of such high curvature points is illustrated in FIG. 5A.

However, this set of high curvature points may be incomplete at least because certain real segmentation points can lie in the middle of a smooth interval whose points have only low curvatures. Hence, an augmentation technique may be utilized according to the present invention to generate a complete candidate set of the curvature points. This can be effectuated by adding an intermediary point in a long interval (determined by a predetermined threshold) between two high curvature points. For example, based on the word "eye" and the high curvature points illustrated in FIG. 5A, it is possible to insert the intermediary point (a transparent point) between the high curvature points which span for a length that is longer that such threshold, as illustrated in the further segmented word "eye" 325 shown in FIG. 5B.

Feature-Link Coding

The segmentation points generated, as described above, segment the handwritten data input into a sequence of intervals (or "feature links"), each of which can be determined by the two consecutive segmentation points. In particular, with a stroke $C=<p_1, p_2, \ldots p_n>$, the segmentation procedure according to the exemplary embodiment of the present invention computes a sequence of the respective segmentation points $S=<p_{k_1}, p_{k_2}, \ldots, p_{k_m}>$, where $p_{k_1} < p_{k_2} < \ldots < p_{k_m}$. Thereafter, the stroke C is subdivided into the intervals $I_i=<p_{k_i}, p_{k_i+1}, p_{k_i+1}, \ldots p_{k_{i+1}}>$, for $i=1$ to $m-1$. The interval determined in this manner preferably contains no corners or cusps. Otherwise, the high curvature points would be detected at such corner or cusps, and the interval would have been further subdivided. The feature links can be considered as sub-stroke or sub-character level primitives which can be associated with the line or the direction that the intervals form.

Figure 6:
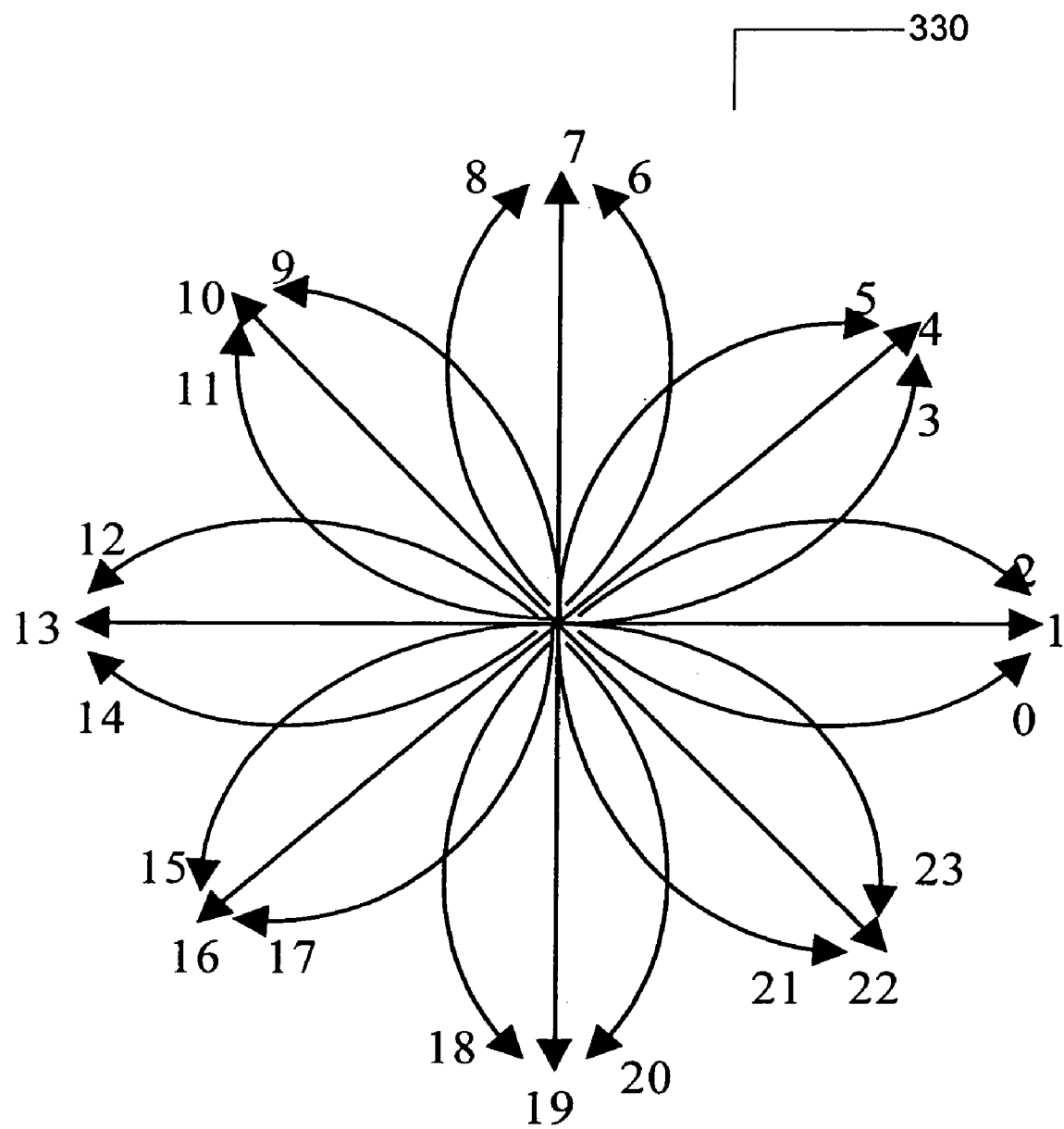
FIG. 6 is an illustration of an exemplary embodiment of directional convex templates according to the present invention which may represent direction and convexity of categories of feature-links.

According to the present invention, it may be preferable to obtain a graph providing base line and reference information for all possible lines or curves formed by the component points of such intervals which can be used to compare the segments or strokes thereto. Thus, as shown in FIG. 6, it is possible to define certain templates, e.g., 24-directional convex templates 330, each representing the direction and the convexity of the corresponding categories of feature links that defines a respective feature link code ("FLC"). The FLC can be a non-negative integer, and, according to one exemplary embodiment, can include 24 of such FLCs ranging from type-0 to type-23, as shown in the FIG. 6. Thus, during a template matching process of the present invention, the strokes of the handwritten data input can be compared with each template, and the label of the closest matching template can be established. For example, with a sub-stroke $C=<p_1, p_2, \ldots, p_n>$, as with feature-link, the "cross-length" of C can be defined as the Euclidean distance between the first point and the last point of the sub-stroke C, such that a cross_length(C)=dist($p_1,p_n$). The templates have a standard scale in terms of the cross-length, and are stored in a storage arrangement of the system. The feature-link templates are also normalized to have the same number of data points using the local level filtering procedures described above.

Figure 7:
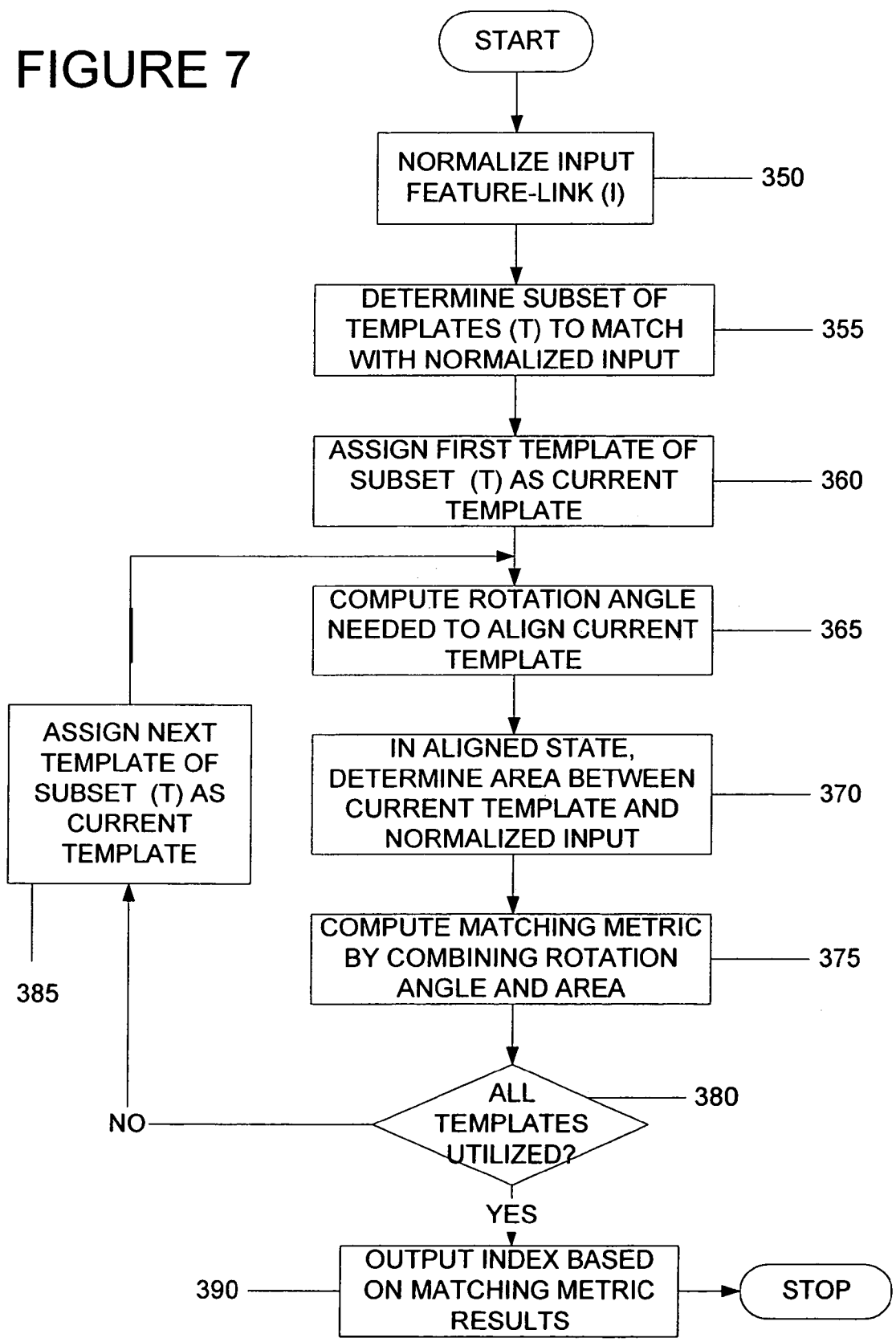
FIG. 7 is a flow diagram of an exemplary embodiment of the process according to the present invention, in which indexes representing the directional template of FIG. 6 are assigned to particular feature-links.

With the feature link templates established as described above, it is possible to assign an index to a particular feature link that represents a particular feature link template which closely matches the normalized input. This task can be performed by the template matching process described briefly above, whose high level steps are provided as follows (and shown as a flow diagram in FIG. 7):

- normalize an input feature link to form a normalized input (I) so as to have the standard cross length and the standard number N of data points by local level filtering (step 350);
- determine a subset T of the templates that can be the candidates to match the normalized input I (step 355);
- set a first template $T_1$ of subset T to be the current template $T_i$ (step 360);
- determine the amount of a rotation angle $\theta$ ($T_i$, I) needed to align the current template $T_i$ with the normalized input I in terms of the starting and ending points (step 365);
- in the aligned state, determine an area A($T_i$, I) between the current template $T_i$ and the normalized input I (step 370);
- determine a matching metric score E($T_i$, I) by combining the rotation angle $\theta$ ($T_i$, I) and the area A($T_i$, I) (step 375);
- if all templates T have been reviewed (step 380), assign the next template to be the current template $T_i$, and go back to step 365 (step 385); and otherwise, output an index k such that index k=arg $\min_i\{E(T_i,I)\}$ (step 390).

In step 355, each template can first be translated to have the same starting position as that of the normalized input I, and the distance between the ending points of the template and the normalized input I can be determined. This distance provides an indication regarding the offset of the template from the normalized input I. For example, the longer the distance, the more discrepancy can exist between the directions of the template and the normalized input I. Therefore, it is not preferable for the template matching process according to the present invention to consider all its feature-link templates. Indeed, only a few of these templates which have the end-point distances smaller than a predetermined threshold are preferably selected as candidates for further processing.

Also, in step 370, the area A($T_i$, I) between the current template $T_i$ and the normalized input I can be an approximation of the gap between them. In one embodiment of the present invention, the current template $T_i=<T_1, T_2, \ldots, T_N>$ and the normalized input $I=x_1, x_2, \ldots, x_N>$. Then, the current template $T_i$ and the normalized input I can be further normalized to have the same representation length N. Then, the area A($T_i$, I) can be defined as:

$$A(T_i, I) = \sum_{j=1}^{N} dist(t_j, x_j)$$

where dist($t_j$, $x_j$) is preferably the Euclidean distance between the start point and the end point of the particular segment. This metric provides a reasonable approximation of the gap between the current template $T_i$ and the normalized input I because the feature links are smooth intervals without having sharp or complex curves.

Figure 8:
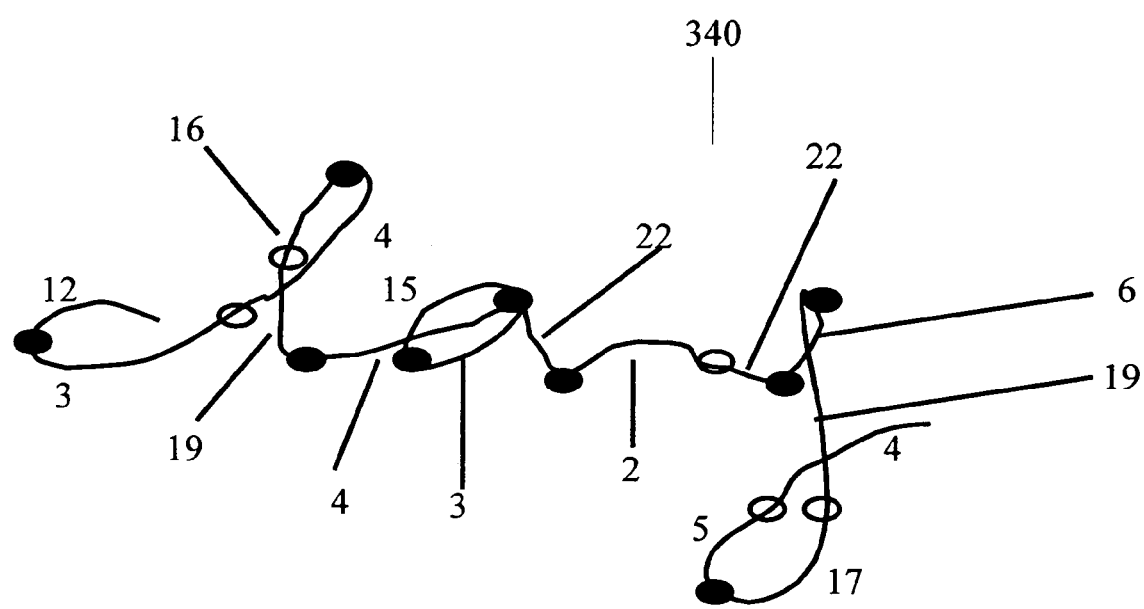
FIG. 8 is an exemplary illustration of a word "day" showing its respective feature links and corresponding codes as scored using the templates of FIG. 6.

In step 375, the rotation angle $\theta$ ($T_i$, I) and the area A($T_i$, I) can be combined to determine the matching metric score, which can be determined as follows:

$$E(T_i,I)=A(T_i,I)^3 \times \exp(c \cdot \theta(T_i,I))$$

where c is a normalizing constant. The lower the value of the matching metric score E($T_i$, I), the better the current template $T_i$ matches the normalized input I. This is because the rotation angle $\theta$ ($T_i$, I) is more significant in determining a match since it measures the level of the directional alignment, and functionally grows more rapidly. Therefore, as the value of the rotation angle $\theta$ ($T_i$, I) grows, the matching metric score E($T_i$, I) would likely to be dominated by such rotation angle $\theta$ ($T_i$, I). If the rotation angles $\theta$ ($T_i$, I) are within a close range, then the matching metric score E($T_i$, I) can be determined by the magnitude of, e.g., the area A($T_i$, I). FIG. 8 shows an exemplary word "day" 340, with the segmentation points identified thereon, and the feature links and their respective FLCs being determined by the template matching procedure described above.

Component Character Recognition

In the exemplary embodiment of the system and process according to the present invention, particular character recognition procedure are implemented (step 150 of FIG. 2) are provided so as to decipher the handwritten text input on the tablet surface 20 of FIG. 1.

Introduction of Fisher Analysis

Fisher's linear discriminant analysis was successfully used for improving the performance of a face recognition task under an extensive variation of lighting conditions and facial expressions. It was used to reduce the large number of dimensions typically involved in face images.

Construction of Fisher Projection Matrix

For example, for a number C of classes $V_1, V_2, V_3, \ldots, V_C$, each class $V_i$ may a population of $N_i$ vectors Vi=$v'_1, v'_2, \ldots, v'_{ni}$. Each data vector can have n dimensions. The Fisher analysis generally considers two types of scatter matrices: one for between-class distribution and the other for within-class distribution. The between-class scatter $\Phi_B$ can be defined as $$\Phi_B = \sum_{i=1}^{C} N_i(\mu_i - \mu)(\mu_i - \mu)^T$$

where $\mu_i$ is the centroid of the class $V_i$, and $\mu$ is the global centroid. The within-class scatter $\Phi_W$ can be defined as $$\Phi_W \sum_{i=1}^{C} \sum_{j=1}^{N_i} (v_j^i - \mu_i)(v_j^i - \mu_i)^T.$$

Therefore, the Fisher technique can use the class label information to describe two comparative kinds of distributions. Given a projection matrix W (of size n by m) and its linear transformation $p=W^T v$, the between-class scatter in the projection space is as follows:

$$\Psi_B = \sum_{i=1}^{C} N_i (\mu_i' - \mu')(\mu_i' - \mu')^T$$

$$= \sum_{i=1}^{C} N_i (W^T \mu_i - W^T \mu)(W^T \mu_i - W^T \mu)^T$$

$$= \sum_{i=1}^{C} N_i (W^T \mu_i - W^T \mu)(\mu_i^T W - \mu^T W)$$

$$= \sum_{i=1}^{C} W^T N_i (\mu_i - \mu)(\mu_i^T - \mu^T) W$$

$$= W^T \left( \sum_{i=1}^{C} N_i (\mu_i - \mu)(\mu_i - \mu)^T \right) W$$

$$= W^T \Phi_B W$$

where $\mu'_i$ and $\mu'$ are the class centroid and the global centroid in the projection space, respectively. Similarly, the within-class scatter $\Psi_W = W^T \Phi_W W$, is likely in the projection space. It is preferable to select a projection matrix W' so as to maximize the between-class scatter, while minimizing the within-class scatter in the projection space, thus widened gaps between the class boundaries which can lead to a better class separability. The Fisher Projection Matrix ("FPM") can be provided in the following form:

$$W' = \arg\max_w \left\{ \frac{|\Psi_B|}{|\Psi_W|} \right\}$$

$$= \arg\max_w \left\{ \frac{|\Psi_B|}{|\Psi_W|} \right\}$$

The construction of the FPM W' can be implemented by solving the generalized eigen value equation $$\Phi_W w = \lambda \Phi_W w$$

and computing the largest eigen values $_1, _2, \ldots, _m$ of the FPM, as well as their corresponding eigen vectors $w_1, w_2, \ldots, w_m$. Thereafter, the respective eigen vectors $w_i$'s form the orthonormal columns of the target projection matrix, that is $$W' = [w_1, w_2, \ldots, w_m]$$

The $w_j$'s are orthonormal columns that maximizes the quantity of the above ratio, and can be formulated as generalized eigen vectors.

Figure 9:
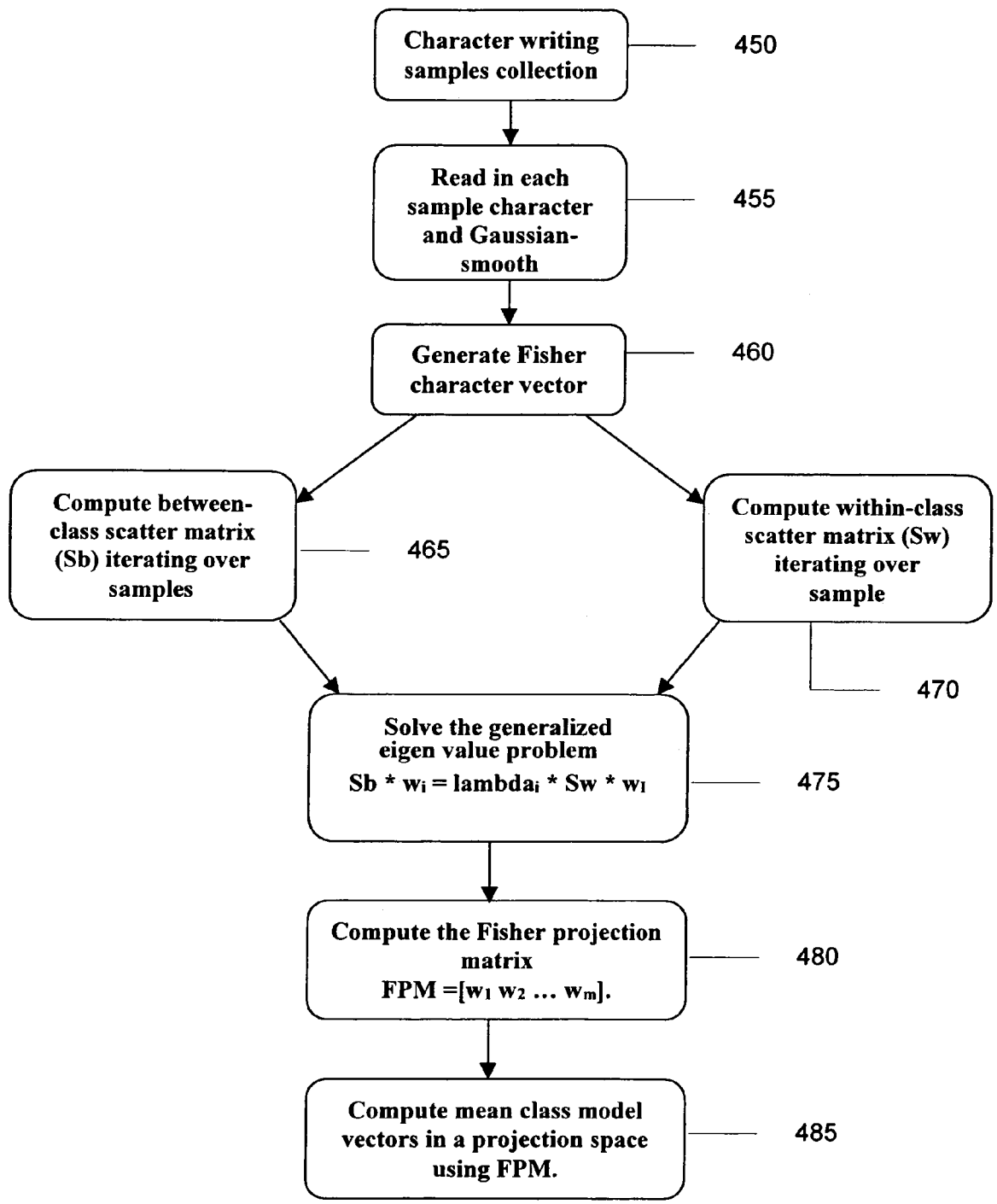
FIG. 9 is a flow diagram of an exemplary embodiment of a Fisher Projection Training technique as used with the handwriting data of the present invention.

FIG. 9 shows a detailed illustration of the Fisher matrix generation procedure according to the exemplary embodiment of the present invention. In particular, character handwritten samples are collected in step 450. In step 455, each sample character is read-in, and the Gaussian smoothing technique is applied thereto. Then, the Fisher Vector can be generated (step 460) as described in detail above. Using this vector, the between-class scatter matrix iterating over the read-in samples can be computed in step 465. In addition, using the generated Fisher character vectors, the within-class scatter matrix iterating over the read-in samples can be computed in step 470. The matrixes computed in steps 465 and 470 can be forwarded to be utilized in the solution of the generalized eigen value problem in step 475. Thereafter, in step 480, the Fisher Projection Matrix (FPM) can be determined based on the results provided in step 475. Finally, the mean class model vectors described above are computed in the projection space using the FPM in step 485.

Fisher Training and Character Recognition

The determination of the Fisher projection matrix using a set of character data vectors can be equated to the training procedure for recognizing the characters using a metric in the Fisher projection space. For example, it is possible to utilize a fixed length ECV (i.e., Expanded Coordinate Vector) described above having particular character samples for this procedure. Accordingly, given a sample S, $ECV_N(S) = \langle x_1, y_1, x_2, y_2, \ldots, x_m, y_m \rangle$ for a constant N. The expanded coordinate values $x_i$'s and $y_i$'s of $ECV_N(S)$ can preferably be re-sampling results of the local level filtering procedure after applying the data normalization procedures (as described above) to the original data. The training data are complied by computing $ECV_N(S_i)$ for each character sample, which is then subjected to the Fisher analysis to construct the projection matrix. In addition, the training process determines the model centroid $m_i$ for each class i. The class vectors are normalized to be unit vectors for the character matching, which can be used at a later point. A vector V, F(V) can be defined as the vector in the projection space mapped by the projection matrix that has been trained by the Fisher analysis. Given an input ECV(y), its Fisher matching score (FMScore) for a class c can be defined as:

$$FMScore(y, c) = \frac{2 - dist(F(m_c), F(y))}{2}$$

where dist( ) is the Euclidean distance. Thus, FMScore( ) can have a range from 0 to 1 because the model centroid and the input data are previously normalized to unit vectors. For example, the FMScore of 1 corresponds to the perfect match, and the FMscore of 0 would indicate a complete mismatch.

FIG. 10 shows a summary of the exemplary Fisher training steps according to an exemplary embodiment of the present invention. In particular:

the training data can be computed and converted into a standard representation (step 510);

the model centroid is computed and recorded in the standard representation (step 515); and the Fisher projection matrix is computed (e.g., see FIG. 9 and the corresponding description provided above) and this matrix is stored (step 515).

FIG. 11 shows a high level diagram of the Fisher character recognition technique according to an exemplary embodiment of the present invention. In particular:

an input y is obtained, and then converted into the standard representation y (step 550);

for each class c, the score $f_c = FMScore(y, c)$ is computed and the pair $\langle c, f_c \rangle$ is generated (step 555);

the pairs <c, $f_c$> are sorted based on a decreasing order into a list L based on the score $f_c$ (step 560); and Return the sorted list L (step 565).

In the embodiment when the handwriting character recognition system and process of the present invention can operate as a stand-alone system and process, and when performing a letter-by-letter handwriting recognition, only the pair <c, $f_c$> or the index c can be returned such that the score $f_c$ is the maximum, instead of performing steps 560 and 565. However, when the handwriting character recognition system and process of the present invention operates as a component of at least a word-level recognition system and process, a more detailed information for generating and managing the string hypotheses shall be used. Instead, an output of a set of candidate characters with the corresponding confidence values which are worth considering can be more desirable for the recognition system and process according to the present invention.

Feature-Fusion Character Recognition

Figure 12:
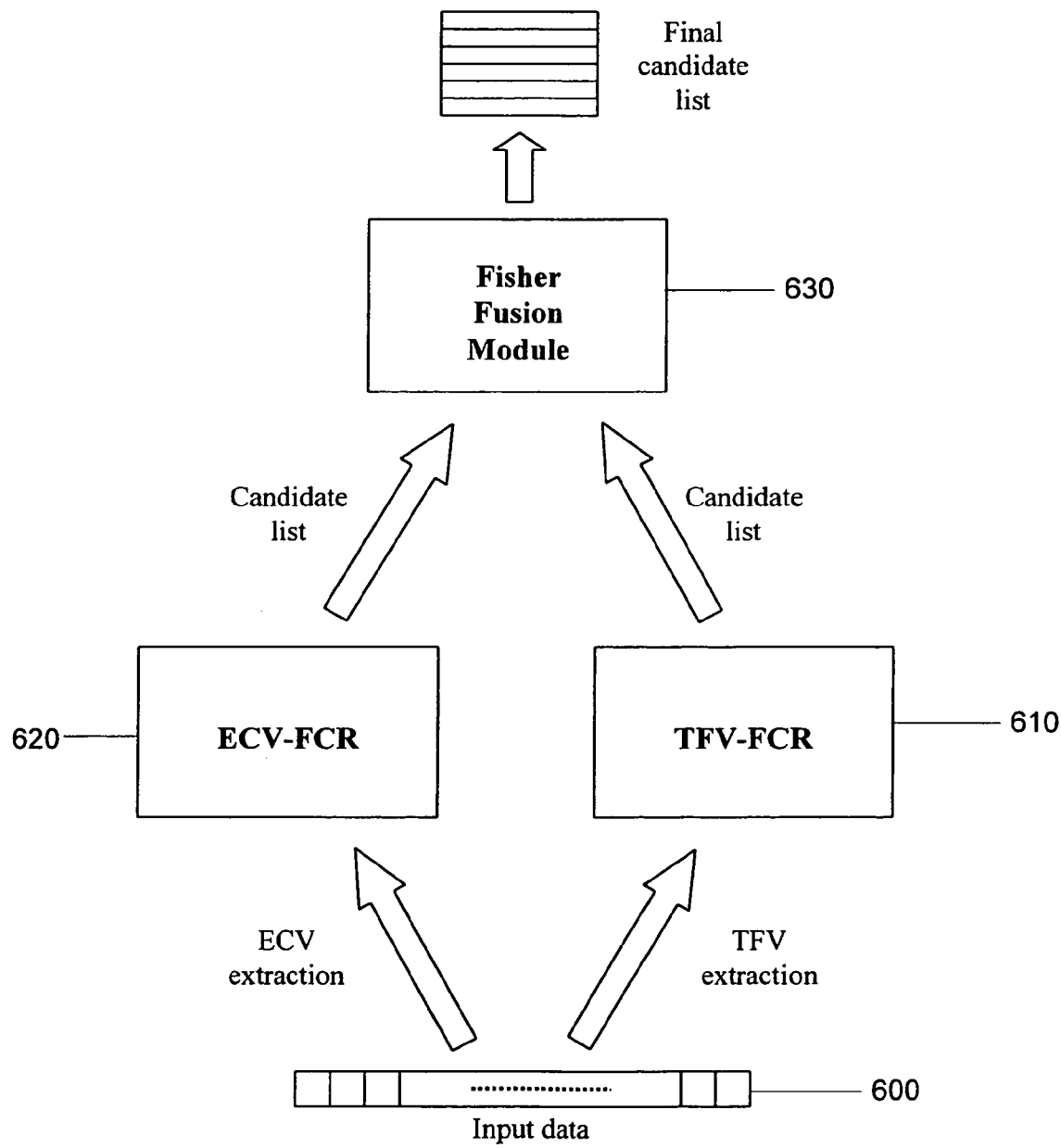
FIG. 12 is a flow diagram of an exemplary embodiment of a feature-fusion character recognition system according to the present invention.

In one exemplary embodiment of the present invention shown in FIG. 12, ECV and TFV described above can be used as the two different base representations. For example, ECV-FCR 620 can be the Fisher character recognition system/module based on ECV representation, and TFV-FCR 610 can be the Fisher character recognizer based on TFV representation. These systems/modules can receive handwritten input data 600, and generate outputs which may be forwarded to a Fisher Fusion Module ("FFM") 630 by integrating the outputs of the ECV-FCR and TFV-FCR at the FFM 620, thus outputting the result which is the final candidate list.

For example, when the handwritten input data 600 has been segmented, the ECV and the TFV vectors are extracted and then provided to the corresponding base recognition modules. In each of these base recognition modules, the Fisher matching technique can be implemented on the candidates so that the candidates that have the scores being within the top 50% will be filtered, and output in a sorted candidate list. Then, these lists can be identified as $L_{ECV}$ and $L_{TFV}$, respectively, for ECV and TFV representations. The lists $L_{ECV}$ and $L_{TFV}$ may include different elements and different lengths. In order to allow the ECV-FCR recognition system/module to perform in a more reliable level, the list $L_{ECV}$ can be used as the primary information source, and the list $L_{TFV}$ may be compared with the list $L_{ECV}$ so as to proceed with the fusion process. For each element pair <c, $f_c$> in the list $L_{ECV}$, where c is a class label and the score $f_c$ is its Fisher matching score, the pair <c, $g_c$> is determined in the list $L_{TFV}$. If such pair <c, $g_c$> does not exist in the list $L_{TFV}$, that means that the TFV-FCR recognition system/module missed the class c as a candidate, and thus the score $f_c$ is penalized by reducing it by 50%. Otherwise, it is possible to reevaluate the score $f_c$ as follows.

$Top_{TFV}$ can be the top score of the list $L_{TFV}$, so as to compute the ratio of $g_c$ with $top_{TFV}$. In particular, the score $f_c$ can be updated to be an updated score $f_c'$ as follows:

$$f_c' = f_c \cdot \frac{g_c}{top_{TFV}}.$$

The updated pair <c, $f_c'$> can be sorted into the final list F. Then, the final list F may be reduced to include items whose scores are within the top 40% of the top score of the final list F.

Figure 13:
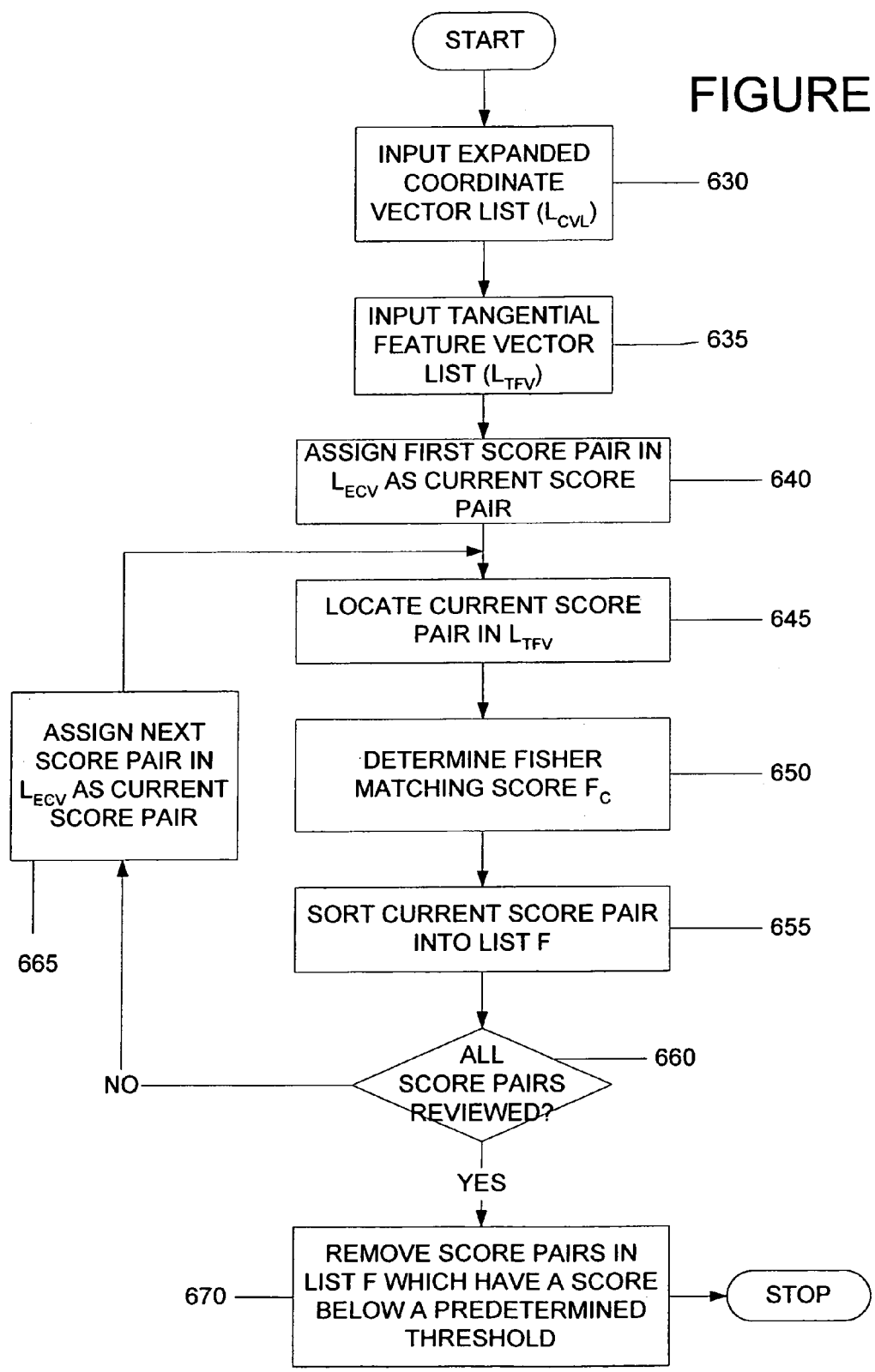
FIG. 13 is a flow diagram of an exemplary embodiment of a Fisher fusion technique according to the present invention.

FIG. 13 shows the exemplary steps implemented by the Fisher Fusion Module according to the present invention which are provided as follows:

Input the expanded coordinate list $L_{ECV}$ (step 630) and the tangential feature vector list $L_{TFV}$ (step 635);

Assign a first score pair <$c_0$, $f_{c0}$> in the list $L_{ECV}$ as a current score pair <c, $f_c'$> (step 640);

Locate the current pair <c, $f_c'$> in the list $L_{TFV}$ (step 645);

Determine the Fisher Matching score $f_c'$ (step 650);

Sort the current score pair <c, $f_c'$> the list F (step 655);

If all score pairs have not been reviewed (step 660), the next score pair in the list $L_{ECV}$ is assigned as the current score pair <c, $f_c'$> (step 665); and Otherwise, remove the score pairs in the sorted list F whose score is below a predetermined threshold (e.g., 60% from the top score)—step 670.

Handwritten Word Recognition

Word Recognition Using a Graph Search Technique

A word level hypothesis can consist of a string of character hypotheses and a confidence score of such list. According to the exemplary embodiment of the present invention, the character hypothesis can include the interpreted character class label, the evaluation score computed by the character recognizing module, and other relevant information (e.g., starting and ending points of the character or curvature, the bounding box thereof, etc.). In particular, the likelihood score is determined as the average of the scores of the component character hypotheses. Also, the scores at each tentative recognized character are added, and the result of such summation is divided by the number of the characters which contributed to the score. Accordingly, the word hypothesis score according to the exemplary embodiment of the present invention can be a measure of how well the handwritten characters are shaped in relation with the Fisher character models stored in a storage arrangement (e.g., a hard disk, CD-ROM, tape drive, etc.) of the system of the present invention.

Figure 14:
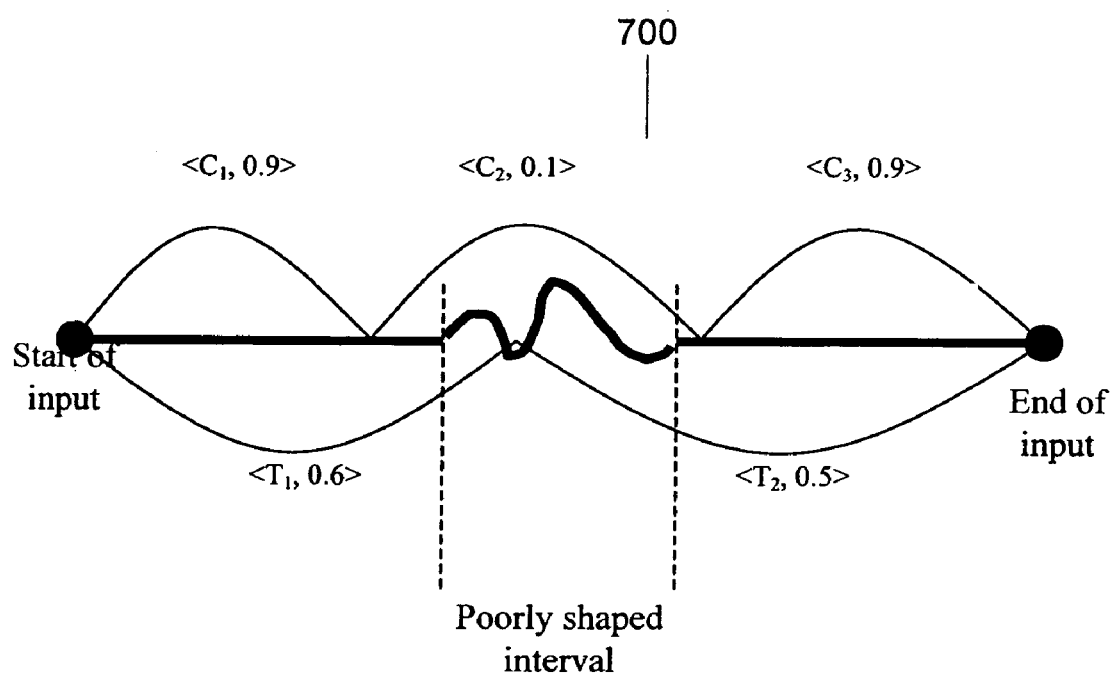
FIG. 14 is an illustration of a hypothetical word input whose middle part is poorly shaped.

FIG. 14 shows a hypothetical word input 700 whose middle portions is poorly shaped, which is provided to illustrate the above-described score determination technique. In particular, the string $C_1C_2C_3$ can provide the correct interpretation of the input. The character recognition score for $C_1$ is 0.9, for $C_2$ it is 0.1 and for $C_3$ it is again 0.9. An incorrect interpretation is provided by the string $T_1T_2$. The character recognition score for $T_1$ is 0.6, and for $T_2$ it is 0.5.

The conventional systems and process generally multiply the character recognition scores in the respective strings to determine the "best" string. In the present example, such traditional systems and methods would obtain the score as 0.9×0.1×0.9=0.081 for the string $C_1C_2C_3$, while the score for the string $T_1T_2$ would be 0.6×0.5=0.3. Accordingly, the score for the string $T_1T_2$ would be larger than that of the string $C_1C_2C_3$. Therefore, the string $C_1C_2C_3$ would likely be improperly rejected, and the incorrect interpretation string $T_1T_2$ determined to be the "best" string. In contrast, the determination procedure of the present invention provides the character recognition score as (09+0.1+0.9)/3=0.63 for the correct hypothesis string $C_1C_2C_3$, which is higher than the score (0.6+0.5)/2=0.55 assigned to the incorrect hypothesis string $T_1T_2$.

Figure 15A:
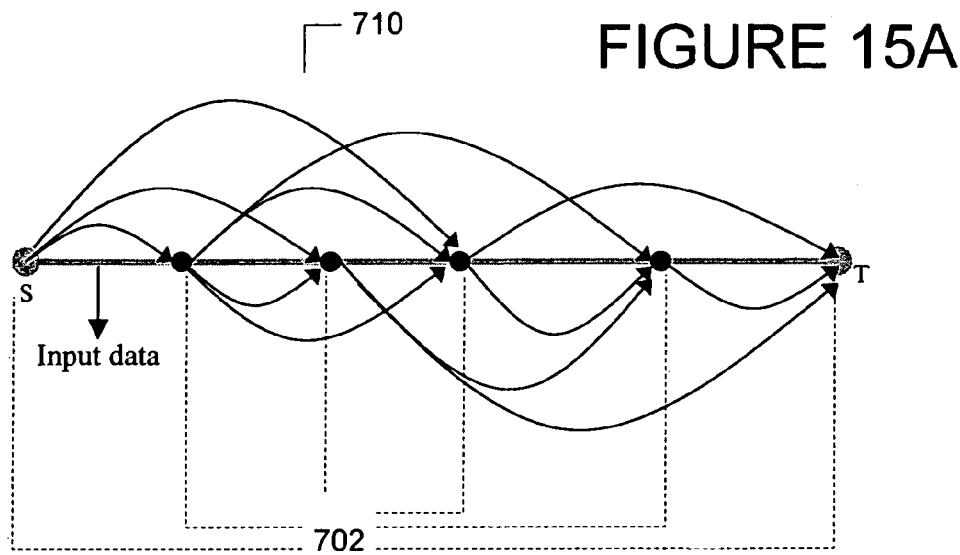
FIG. 15A is a segmentation graph of a word input having segmentation points provided thereon.

Using the segmentation points and the rules to form the character segments according to the present invention, the structure of the curves generated by the handwriting recognition procedure can be formulated as a graph 710, as shown in FIG. 15A. For example, the segmentation points 702, along with the starting and ending points of the handwritten input data, can be regarded as the set of vertices. The starting point may correspond to a vertex s, and the ending point to a vertex t. A directed edge s→t between two nodes s and t can be regarded as representative of the segment starting from the segmentation point represented by the vertex s, to the segmentation point represented by the vertex t. The techniques of the present invention described above determine which edges are present in the graph 710. It should be noted that the graph 710 is a directed acyclic graph ("DAG") because the edges of the input data are directed forward, and do not return with respect to time.

Figure 15B:
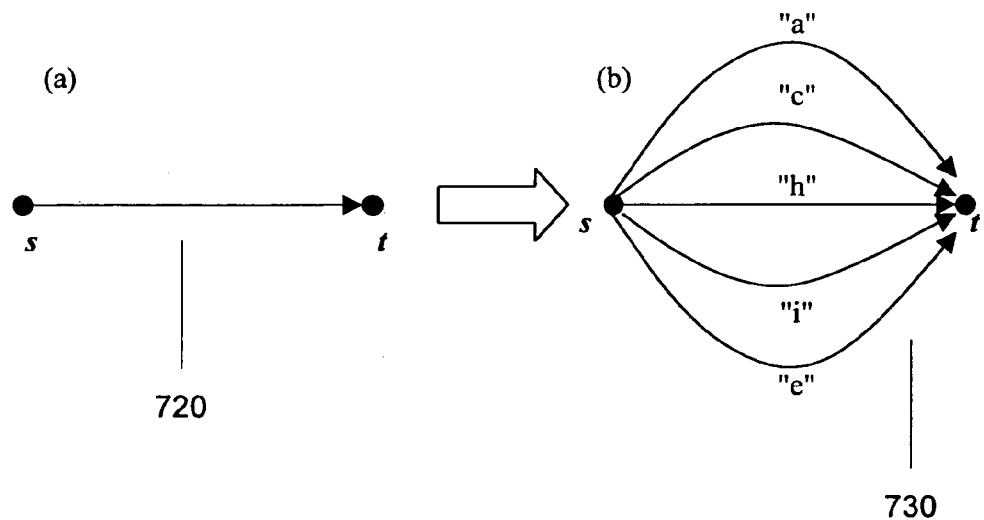
FIG. 15B is an illustration of an exemplary transformation of an edge from the segmentation graph of FIG. 15A to an edge which is expanded into multiple interpreted edges.

Thereafter, the segmentation graph can be expanded into an "interpretation graph," as shown in FIG. 15B. In this interpretation graph, each unlabeled directed edge in the segmentation graph can be interpreted by invoking the character recognition procedure according to the present invention with the corresponding segment 720 as the input. Then, this segment is replaced with a set of edges 730 having substantially the same source and destination vertices as shown in FIG. 15A, being labeled with the character class index (and possibly the evaluation score).

In this manner, the handwritten words can be recognized by locating the optimal path from the starting vertex s to the ending vertex t in the interpretation graph of FIG. 15B. The character recognition score of the path is preferably a function of the scores of the edges contained in the path, which is performed by the summation and averaging procedure (i.e., of the scores) described above. According to the present invention, it may be preferably to utilize a modified topological-sort algorithm for the performing the search of the handwritten character data, in which a list of multiple predecessors can be established at each propagation point, instead of a single point.

Hypotheses Propagation Network

Figure 16:
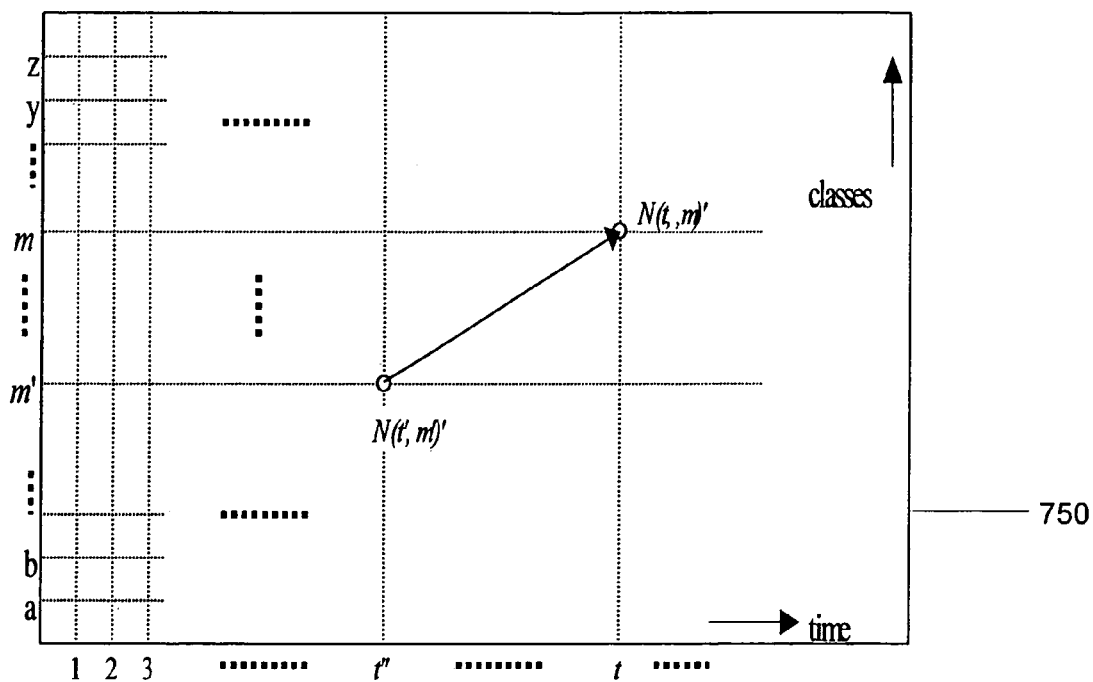
FIG. 16 is a lattice structure of an exemplary embodiment of a Hypotheses Propagation Network ("HPN") according to the present invention, with an example of an edge provided therein.

The handwriting recognition engine/module of the system and process according to the present invention can be referred to as a "Hypotheses Propagation Network" ("HPN") which is shown as block 235 of FIG. 3. As shown in FIG. 16, the HPN may have a two-dimensional lattice structure 750, which applies the above-referenced interpretation graph and the search procedure thereon as shall be described in further detail below. One dimension or axis of the HPN is the dimension of time in terms of the segmentation points—the first segmentation point starting at time 1, the second segmentation point starting at time 2, etc. The other dimension or axis provides the indices of the character classes.

The intersections of the MPN's lattice structure corresponds to a node N (t, m), where t is the time and m is the index of a character class. Given two nodes N (t', m') and N (t, m) where t'<t, the edge N (t', m')→N (t, m) corresponds to the segment from time t' to time t in the input that can be interpreted as the class m, having m' as its predecessor. The class m is the index of a character class (e.g., m=1, . . . , 23 for the alphabet, m=1, . . . , 46 if upper and lower case characters are considered as separate classes, and m=1, . . . , 92 if cursive and type characters are being considered separately, etc.). Each node may have its character hypothesis score determined by, e.g:

a Fisher matching technique for the interval between the predetermined time w and time t, and a hypothesis score for all the letters up to time w (H[q, w] with the number of characters up to time w, divided by (1+ number of characters up to time w), and/or a visual bigram hypothesis that determines whether the visual parameters are consistent with a bigram (q,m) at time stages (w,t), the details of which shall be described in further details below.

In effect, the node N may represent a string of characters, and has the score of the path leading to such node N associated therewith. That score is preferably the average of all the Fisher matching scores of the characters contained in the path that the node N represents, with the procedure according to the exemplary embodiment of the present to calculate the scores in such manner has been described above. In particular, in order to compute the path score, the node N includes two fields. The first field is the total accumulated character scores W in the path. The second field is the number of characters x in the path of the node N. Thus, the path score can be calculated by dividing the value of the first field (i.e., the total score) by the value of the second field (i.e., the total number of characters in the path of the node N)–W/x.

Figure 18:
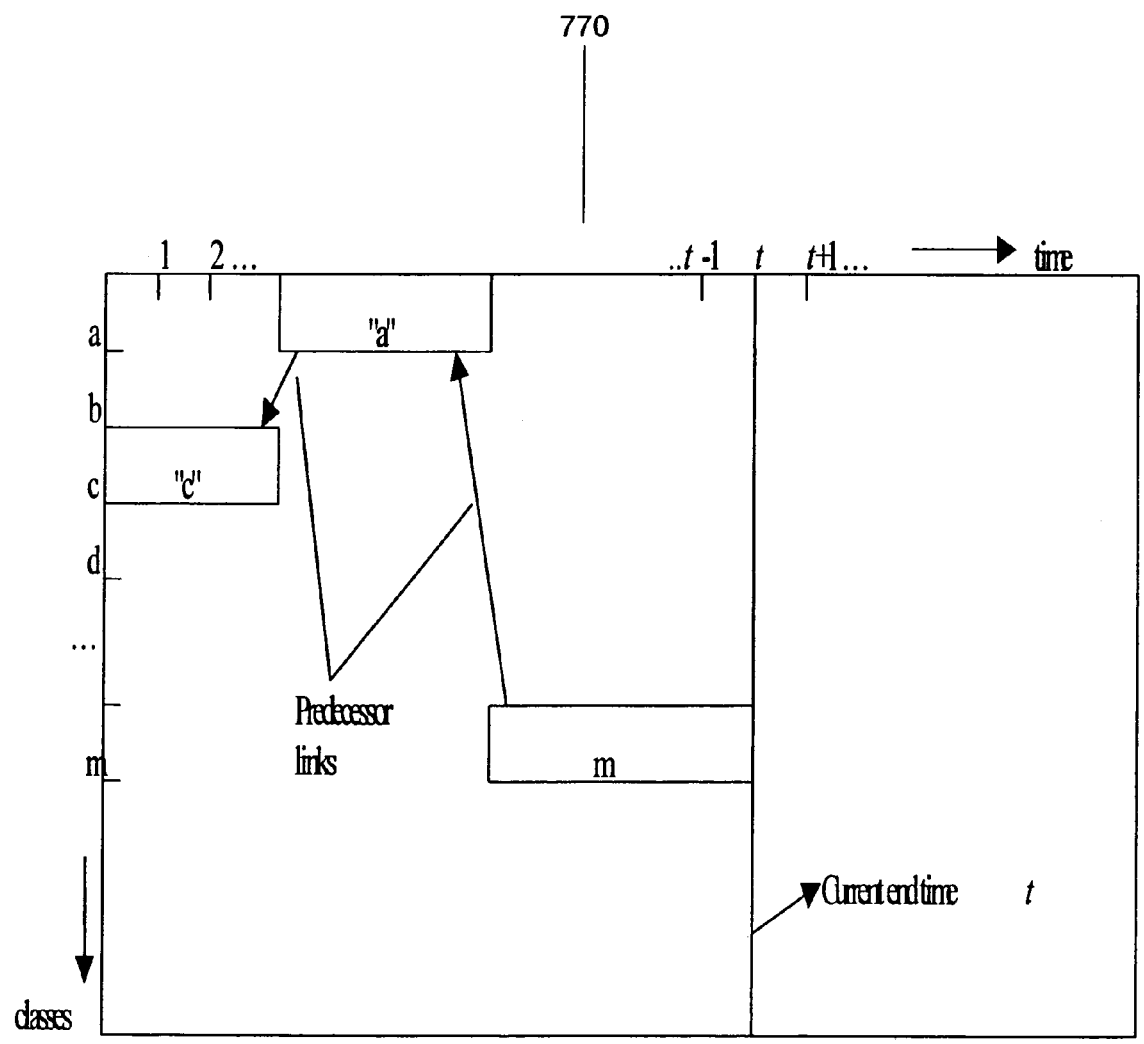
FIG. 18 is a sample partial recognition path for recognizing handwritten words using the HPN according to an exemplary embodiment of the present invention.

FIG. 18 shows the exemplary HPN lattice structure 770 in which the two-dimensional matrix or hypothesis H[m, t] represents all the partial recognition paths of the HPN ending at time t with the last character m, with each of the nodes having its own number of characters and path scores.

HPN Search

Figure 17:
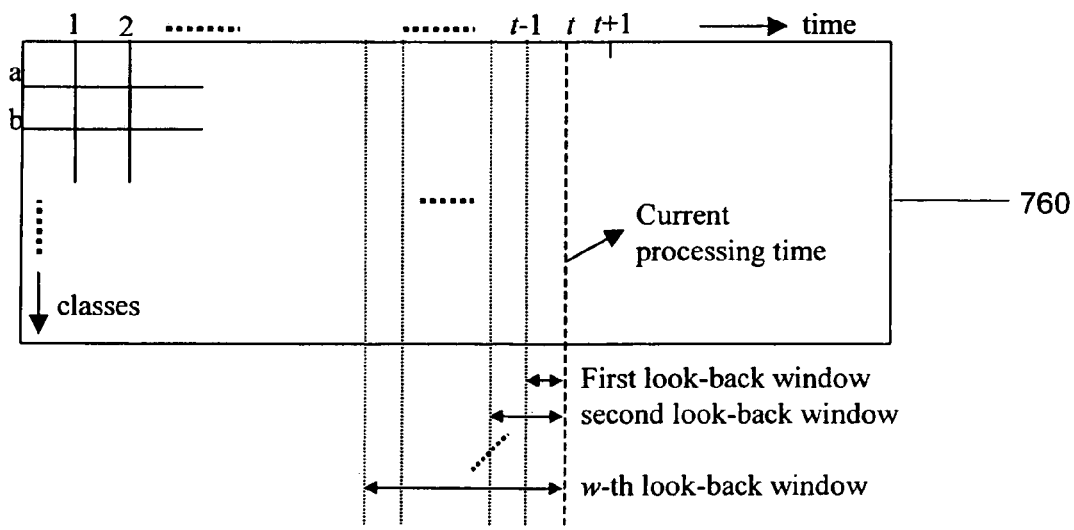
FIG. 17 is an illustration of look-back windows of the HPN of FIG. 16, ending at a particular current processing time.

Using the HPN, the interpreted edges are constructed dynamically by the segment generation rule described above. As shown in FIG. 17, at each processing time t, a portion 760 of the HPN's lattice structure looks back in time and ranges over the look-back windows of sizes from 1 to a predetermined size w which can be considered a maximum size. According to a preferred embodiment of the present invention, the predetermined size w can be equal to 6, however other sizes are conceivable, and are within the scope of the present invention. In this manner, the i-th look-back window $W_i$ starts the look back at time t−i and ends at t. Thus, the look back windows can analyze up to the predetermined number w to recognize a possible character.

In particular, for each $W_i$, the HPN transmits the feature vector (extracted from the corresponding data segment) to the component character recognizer, which in turn returns the list of candidates $m_1, m_2, \ldots, m_k$. For each of the candidate $m_j$, the HPN iterates over the nodes N (t−i, m'), and determines whether or not to place the edge/segment N (t−i, m')→N (t, $m_j$) in the graph. It is also possible to score the additional edge/segment when it is placed in the graph.

The decision of whether to place the edge/segment into the graph and/or the scoring thereof can be based on the information coming from various hypothesis-filtering models. One example of such model can be is the use of the lexicon or dictionary. In particular, if the string corresponding to a hypothesis that has been propagated to the node N (t−i, m') which forms a legal prefix of the lexicon if $m_j$, which is concatenated to thereto, then the new prefix is identified to be legal in the dictionary and the edge/segment is permissible and/or the score can be higher therefore.

In contrast to the conventional programming search techniques, the HPN of the exemplary embodiment of the present invention preferably uses multiple predecessors. For example, at each node N (t, m), the HPN of the present invention preferably stores a list of the word level hypotheses H (t, m), each of whose elements being a hypothesis which ends at time t (with the character of class m as the last character of its string). For the edge/segment N ($t_1$, m')→N ($t_2$, m), the HPN can iterate on each element of H($t_1$, m'), compute a new hypothesis with the score of the edge/ segment and the class label m, and insert the score and the hypothetical character into the list H ($t_2$, m).

Figure 19:
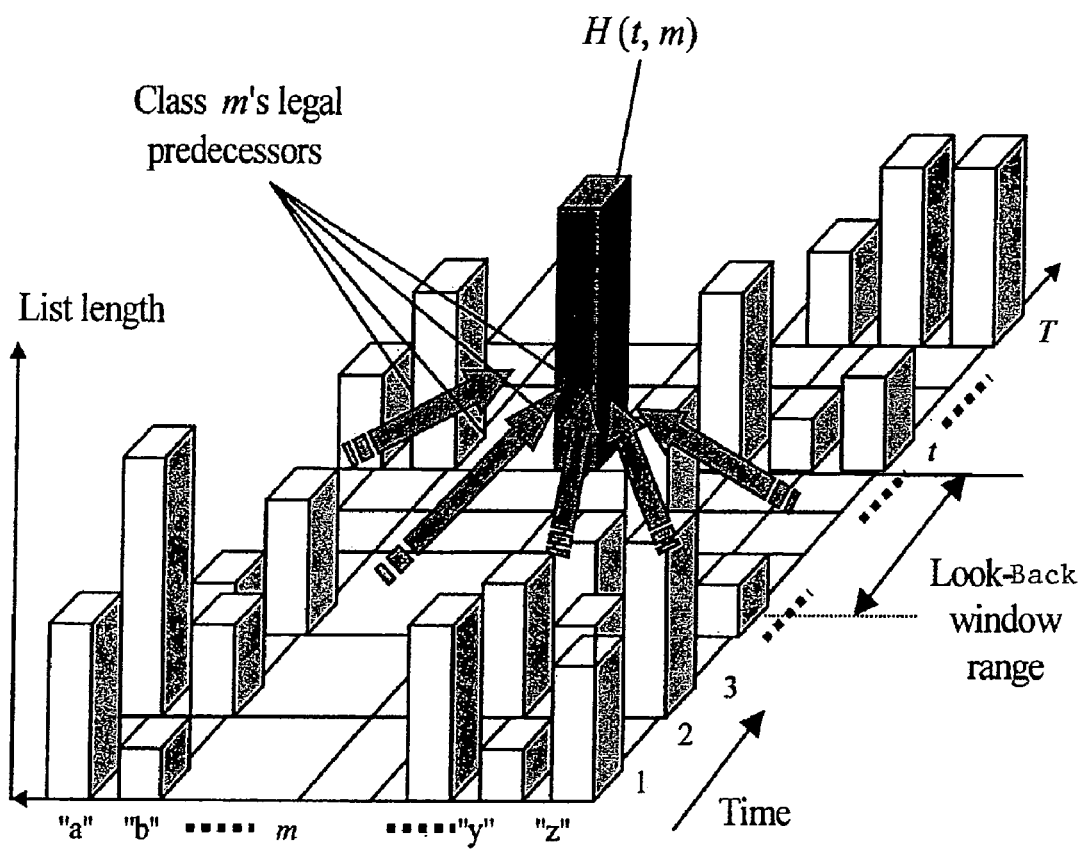
FIG. 19 is an illustration of an exemplary instance of the HPN of FIGS. 16 and 18 in which a hypotheses list is generated for each particular time and input.

FIG. 19 shows an exemplary score diagram 780 generated in this manner, with the path scores being inserted therein. After the last time T, the lists H (T, *) can be merged into a single sorted list H. This list H can be the sequence of candidate words recognized by the system, ordered according to the confidence or score values.

Trimming Hypothesis List

By allowing multiple hypotheses to end on the same propagation node (without any limit on the length of the lists H (t, m)) can lead to intractable computation. This is because the hypothesis and propagating process may likely encounter exponentially growing number of predecessors. The hypotheses filtering procedures and models described in further detail below can be used to trim the HPN search by possibly blocking the propagation of the hypotheses that are determined to be inconsistent with other information provided for the hypotheses. With respect to the HPN, all H (t, m) can be restricted to have, at most, a predetermined number of items. At the other level, the maximum number of hypotheses at each time t is can also be restricted to a predetermined number U. This can be achieved by maintaining, at most, U number of hypotheses at time t (in terms of their hypothesis scores) that are distributed over H (t, *)'s. The predetermined numbers C and U are part of the parameters controlling the accuracy and the execution speed of the system and process according to the present invention.

Hypotheses Filtering Models/Techniques

By relying only on the scores assigned by the component character recognition system and process of the present invention, a large number of hypotheses may be generated, many of which may be unusable. For example, certain English characters can be inherently ambiguous: "o" vs. "0," "1" vs. "I," "1" (one) vs. "l" (lowercase "L"), etc. In many situations, the ambiguities of such characters can preferably be resolved by taking a particular context into consideration. With a contextual perspective, however, many of the generated hypotheses may not necessarily make sense, and may be eliminated from further propagation and consideration. The economy of the hypothesis propagation, consideration and processing time obtained using such filtering procedures substantially contributes to the performance of the system and process according to the present invention. The preferred embodiments of such advantageous filtering models/procedures are described in further detail below.

Dynamic Lexicon

The most common models/techniques of context information utilize a lexicon, e.g., a dictionary of permissible words. The lexicon filtering procedures can be applied either after the generation of word candidates or during the propagation process. In still another conventional approach, the lexicon can be dynamically reduced at an early-recognition stage using a fast recognizer-type method as described in G. Seni et al., "Large Vocabulary Recognition of On-Line Handwritten Cursive Words," IEEE Trans. Pattern Analysis and Machine Intelligence, Vol. 18, No. 7, July 1996. The purpose of using such early-recognition procedure is to determine a small set of plausible candidate words (instead of single most-likely word), thereby reducing the size of the lexicon. Thereafter, it would be possible to focus primarily on the reduced lexicon. A statistical n-gram modeling of character sequences can also be used for the system and process according to the present invention, and may be preferable if it is necessary to recognize certain words which are not in the lexicon.

In a preferred embodiment of the present invention, the dictionary can be organized into a tree-type data structure, and dynamically accessed when the HPN attempts to propagate a word hypothesis. For example, a non-leaf node of such lexicon tree may correspond to a legal prefix of the system, such as a proper prefix of a full word. The full words are generally represented by the leaves of this tree data structure. Each word level hypothesis may include a pointer to the node of the tree, which corresponds to the prefix string representing the particular word hypothesis. Thus, when the HPN according to the exemplary embodiment of the present invention processes a hypothesis h that ends at a particular HPN node for propagation (with an edge/segment interpreted as a character class x), the HPN looks up the tree node of the hypothesis h. If this HPN node has the hypothesis x as a successor, the hypotheses h can be extended to another hypotheses h' which includes x as the last character. In this manner, the system and process according to the present invention can dynamically prevent a hypothesis from being extended to a non-permissible string, and all word level hypotheses generated and propagated can be limited to the "legal" prefixes of the lexicon.

Ligature Modeling

The way the character written in cursive script connects with its surrounding characters (i.e., via the ligatures) provides the variability of such character. This concept is similar to the "co-articulation" in speech recognition, in which a phoneme has greater variation in the pattern around the border with the neighboring phonemes. Ligatures, are not necessary, but generally present in the continuous cursive writing used by many users because they allow a faster writing to be implemented. The ligatures can be modeled since there are certain regularities in their formation, and they can be used to measure how well the hypothesis may be formed. By appropriately modeling or filtering away these dummy "bridges" or ligatures, it is possible to obtain more regularity in the shapes of the characters. The difficulty of modeling ligatures may arise, however, at least because they may be context sensitive. Also, taking the full contexts into consideration may lead to a proliferation of the models. In the English language, there may be few alphabetic constraints on the formation of the ligatures that could be exploited for more concise modeling.

Use of Feature-Link Code for Model Ligatures

The feature-link code ("FLC") and the 24 convexity-directional feature-link templates are shown in FIG. 6 (along with the indices assigned to the individual templates) and described above in great detail. Also, FIG. 8 and the accompanying text provides the details for a sample handwriting of the word "day," its feature-link intervals and the FLCs. From this exemplary handwritten data, it can be seen that the FLC is a compact representation which can be used to describe a smooth contour interval. According to the exemplary embodiment of the system and process of the present invention, the feature-link interval can be the smallest unit along which the entire input may be broken down. As described above, the character segment is generally formed as a consecutive sequence of the feature-link intervals.

Thus, a ligature (if present in the handwritten data) can also be a sequence of the feature-link intervals between two character segments. According to the present invention, it is preferable to use the feature-link intervals to obtain a hypotheses regarding the ligatures. The ligature segment, however, does not need to contain many feature-link intervals in normal handwriting. This is because, unlike the characters, the ligature segment serves merely as a connector between the characters, and its shape does not usually have a complex structure, being smooth interval with certain degree of convexity. Since the FLC can be computed and stored into a table by the pre-preprocessing modules, the system and process according to the present invention (e.g., the HPN) would need to only check such table.

For the filtering purposes, it is preferable to create two lookup matrices—IsRequired[$c_1$, $c_2$] and IsLegal[$c_1$, l, $c_2$], where $c_1$ and $c_2$ range over character class indices, and l is the respective FLC. IsRequired[$c_1$, $c_2$] generates a value "TRUE" if a ligature is required between the two character classes $c_1$ and $c_2$ in a continuous writing data, and "FALSE" otherwise. IsLegal[$c_1$, l, $c_2$] is set to "TRUE" if the FLC l is a permissible ligature between $c_1$ and $c_2$, and "FALSE" otherwise. The quantity of IsRequired[$c_1$, $c_2$] can be used when the segments of $c_1$ and $c_2$ touch one another, thus requiring no ligature there between. If IsRequired[$c_1$, $c_2$] returns "TRUE" in this case, that indicates that $c_1$ followed by $c_2$ is mis-hypothesized because they require a ligature in a continuous formation. When two characters $c_1$ and $c_2$ are separated by an interval labeled with the FLC l, the matrix entry IsLegal[$c_1$, l, $c_2$] can be looked up by the system and process according to the present invention so as to determine if the ligature is formed in a permissible manner. Thus, if the hypothesis being considered by the HPN for the extension with such context is not consistent with the ligature models, such an instance can be blocked from further propagation. The value can be entered into the matrix entries by training performed in the samples, and using the observed probability quantity therefrom (instead of the Boolean values). It is also possible to make such entries manually.

Examples and Experimental Results when Modeling Ligatures

Figure 20A:
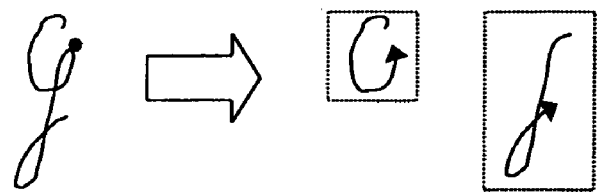
FIG. 20A is an illustration of an incorrect segmentation of the letter "g" into the word "oj"
Figure 20B:
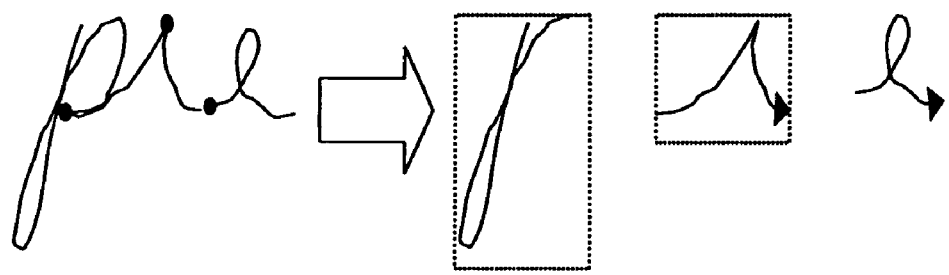
FIG. 20B is an illustration of an incorrect segmentation of the word "Jie"
Figure 20C:
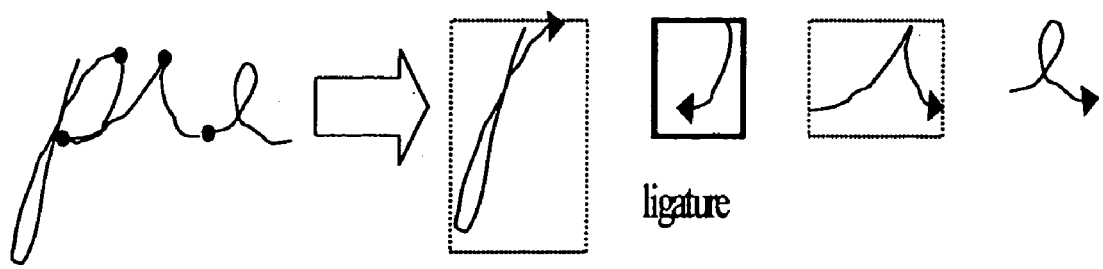
FIG. 20C is an illustration of a correct segmentation of the word "pie" using an embodiment of the present invention which recognizes ligatures.

FIGS. 20A-20C show two examples of the possible use of the matrices IsRequired[$c_1$, $c_2$] and IsLegal[$c_1$, l, $c_2$]. In particular, FIG. 20A illustrates an incorrect segmentation of the handwritten letter "g" into the letters "o" and "j." The string "oj", when written continuously, generally utilizes a ligature between the two characters. This is because without using the ligature for this handwritten combination, the output string would have a shape of the letter "g." Using the look-up matrices described above, the result of IsRequired ["o", "j"] for this combination would be "TRUE". Because the segmentation provides no room for a ligature, the system and process of the present invention can likely detect that the possible combination "oj" has been interpreted incorrectly and remove such possibility.

FIGS. 20B and 20C illustrate the segmentation and interpretation of the handwritten word "pie". In particular, FIG. 20B shows an incorrect segmentation of the handwritten word "pie" into "jie." However, as can be seen from the figure, the direction and the convexity of the hypothetical ligature between "j" and "i" is not likely to be a possible pattern. Therefore, the FALSE output will be generated at the entry IsLegal["j", l, "i"], where l is the FLC of the ligature.

Visual Bigram Modeling

The ligature modeling procedure of the present invention is one exemplary procedure for the hypothesis filtering model using a visual context. With the visual bigram modeling, the geometric characteristics of the character hypotheses are compared to determine the consistency with one another. The variability of the relative geometric information (e.g., the relative size and positioning of a character unit in comparison with its neighbors) can be modeled, and the fitness of a hypothesis can be evaluated according to the modeling techniques. A single character can be highly ambiguous, while its identity can be more evident when provided in a context.

Figure 21:
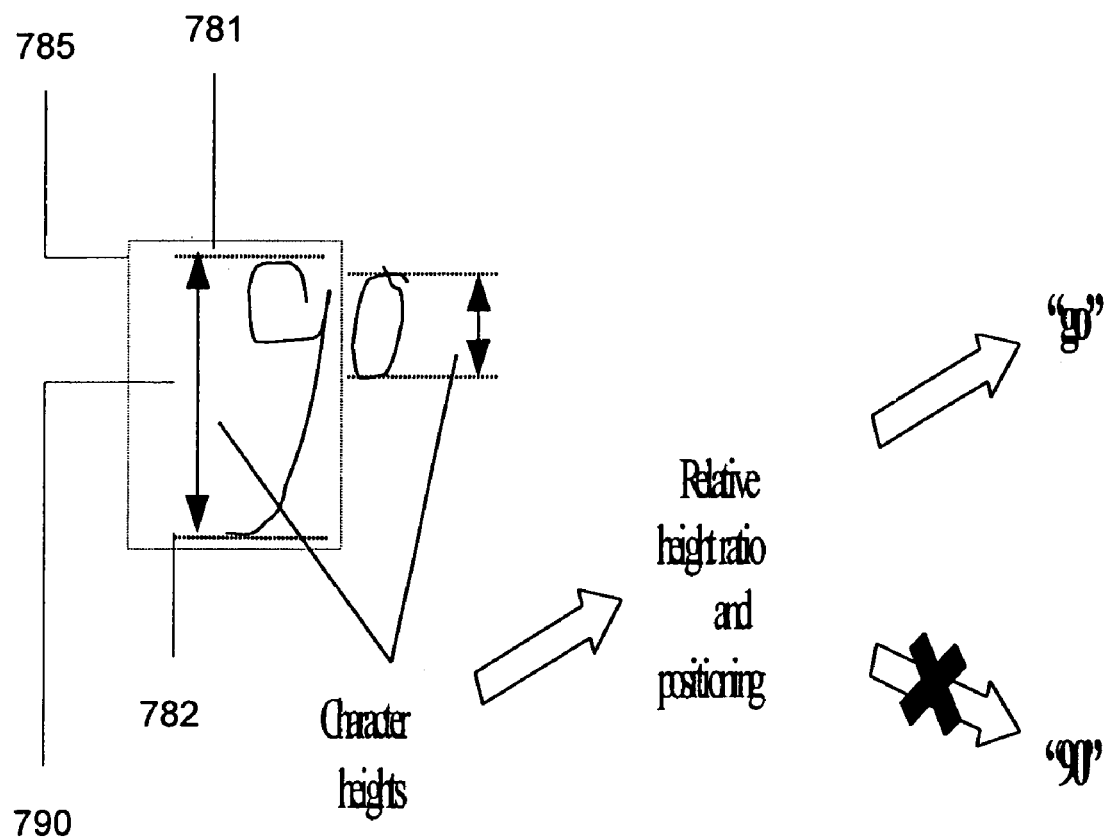
FIG. 21 is an illustration of different segmentations of the handwritten characters which can be subjected to visual bigram modeling techniques according to the present invention.

For example, FIG. 21 shows that the handwritten word "go" can be confused with the combination "90" when the individual characters are evaluated. However, if the relative size and the positioning of the second character hypothesis are taken into account in relation with the first character hypothesis, it becomes easier to establish that the word "go" is the more likely interpretation of the handwritten data.

Modeling Visual Bigram Information

According to the exemplary embodiment of the present invention, when the feature vector is extracted for a particular character segment by the local level filtering procedure as described in further detail above, the bounding box of the segment is also determined. For example, a visual bigram <$c_1$, $c_2$> can be a pair of two consecutive character hypotheses $c_1$ and $c_2$, along with the information of their respective bounding boxes. Given the visual bigram <$c_1$, $c_2$>, let top$_i$ be the top-most y-coordinate of a bounding box 785 of the hypothesis $c_i$ in FIG. 21 (e.g., the bounding box 785 and a point 781 of the letter "g");

bottom$_i$ be the bottom-most y-coordinate of the bounding box of the hypothesis $c_i$ (e.g., a point 782 of the letter "g" in FIG. 21); and $h_i$=top$_i$−bottom$_i$, that is the height of the bounding box 785 of $c_i$ (e.g., a distance 790 in FIG. 21).

The combined height of the visual bigram <$c_1$, $c_2$> is defined as H(<$c_1$, $c_2$>)=max (top$_1$−top$_2$)−min (bottom$_1$−bottom$_2$). Next, three functions of the visual bigram <$c_1$, $c_2$> can be defined as follows:

$$\text{Height difference ratio: } HDR(\langle c_1, c_2 \rangle) = \frac{h_1 - h_2}{H(\langle c_1, c_2 \rangle)};$$

$$\text{Top difference ratio: } TDR(\langle c_1, c_2 \rangle) = \frac{top_1 - top_2}{H(\langle c_1, c_2 \rangle)}; \text{ and}$$

$$\text{Bottom difference ratio: } BDR(\langle c_1, c_2 \rangle) = \frac{bottom_1 - bottom_2}{H(\langle c_1, c_2 \rangle)}.$$

In one example, a model $M_H$ can measure the fitness of the height difference ratio of an input class visual bigram <$c_1$, $c_2$>. For lowercase English alphabet, each $c_i$ ranges over 26 letter classes, and a procedure would utilize 26×26=676 bigram classes for two hypotheses (e.g., two characters). According to the exemplary embodiment of the present invention, it is preferable to utilize the relative size and positioning between the characters. Thus, by categorizing the letters into groups according to this criteria, the number of required bigram classes can be greatly reduced. Therefore, it is preferable to consider the type of strokes made for each character or letter.

In one exemplary implementation of the present invention, the three types of handwritten sub-strokes can be used—"ascender", "descender" and "none". The ascender can be a sub-stroke extending beyond a predetermined upper-baseline of the lowercase letters. The descender may be a sub-stroke extending below a predetermined lower-baseline of the lowercase letters. The last type of stroke, i.e., "none", does not extend above the upper-baseline and below the lower-baseline of the lowercase letters. Accordingly, in a preferred embodiment of the present invention, all lowercase letters can be divided into three groups: a first group having the ascenders, a second group having the descenders, and a third and last group having neither, i.e., being the third class. The table below shows the three categories, possible names and exemplary corresponding member letters for the classes.

| Ascender or descender | Type name | Letter Members |
|---|---|---|
| Ascender | A | b, d, f, h, k, l, t |
| Descender | D | d, f, g, j, p, q, y, z |
| None | N | a, c, e, i, m, n, o, r, s, u, v, w, x |

In this manner, the 26-letter classes have been reduced to just 3 classes of "A", "D" and "N" representing the "ascender" group, the "descender" group and the "none" group respectively. Therefore, only 9 bigram classes would have to be utilized between two characters (or hypotheses) as provided by:

$$\{A, D, N\} \times \{A, D, N\}: \langle A, A\rangle, \langle A, D\rangle, \langle A, N\rangle,$$
$$\langle D, A\rangle, \langle D, D\rangle, \langle D, N\rangle,$$
$$\langle N, A\rangle, \langle N, D\rangle, \langle N, N\rangle.$$

A model $M_H$ can be generated for 9 bigram classes as provided above, instead of 676 without using the above described classifications.

FIG. 22 shows the exemplary flow diagram of the steps utilized for determining $M_H(<c_1, c_2>)$ for the class $<l_1, l_2>$ (with $l_1$ and $l_2$ being the classes of "A", "D" and "N" described above). In this figure, The Height Difference Ratio of two consecutive character hypotheses—HDR($<c_1, c_2>$)—is determined in step 810.

Then, the HDR($<c_1, c_2>$) is compared the parameters of the corresponding character class $<l_1, l_2>$ in step 815; and The confidence value of HDR($<c_1, c_2>$) is generated as being that of the corresponding character class $<l_1, l_2>$.

The models $M_T$ and $M_B$ (measuring the fitness of the top-difference ratio and the bottom difference ratio, respectively) can be calculated similarly to the calculation for the model $M_H$. Therefore, the score for the character combination of the visual bigram $<c_1, c_2>$, using the modeling of the visual bigram information can be summarized in the following form:

$$VBScore(<c_1,c_2>)=k_H \cdot M_H(<c_1,c_2>)+k_T \cdot M_T(<c_1,c_2>)+k_B \cdot M_B(<c_1,c_2>),$$

where $k_H$, $k_T$ and $k_B$ are coefficients or weights assigned to the corresponding models.

Training Visual Bigram Model

In order to compute the score VBScore($<c_1, c_2>$) for the model M($<c_1, c_2>$) which is $M_H$, $M_T$, and/or $M_B$, it is preferable to compare the related difference ratio of the visual bigram $<c_1, c_2>$ with the parameters of the model. This can be achieved by a look-up into a table storing a distribution histogram of the ratio. The parameters of the visual bigram model ("VBM") can be trained by constructing the model distributions from the visual bigram samples.

As an example, the training of the HDR model for the bigram class of <A, A> can be considered as follows. The set of the HDR values for <A, A> class samples are collected first. Also, S=$<s_1, s_2, \ldots, s_k>$ can be a sorted list of the HDR values. Thus, the interval [$s_1, s_k$] can be divided into N equal length sub-intervals. There are ten bins established for each such sub-interval so as to count the number of $s_i$ values that fit inside the sub-interval. After this counting procedure is completed, the sequence of the bins may preferably form the histogram of the distribution of the HDR values. Thereafter, the histogram can be processed by applying a Gaussian smoothing technique thereto to form the trained histogram.

After the training procedure, the quantity in a particular histogram slot represents a likelihood of the HDR values that fall within such slot. The training procedure applied to the rest of the models $M_T$ and $M_B$ proceeds in a similar manner. The above-described training procedure can be iterated and repeated on each of the 9 bigram classes so as to obtain a total of 27 histograms as a result of this procedure.

FIG. 23 shows a flow diagram for establishing a score for the model according to an exemplary embodiment of the present invention. In particular, after the histogram is established for the model M (as described above), the model score on the inputted visual bigram of character hypotheses $<c_1, c_2>$ is determined as follows:

determine the model M's difference ratio R from the visual bigram $<c_1, c_2>$ in step 830;

compute a histogram slot index k from the difference ratio R in step 835. In particular, this index k can be determined as follows:

k=[R-min)/slotsize], where min is the lower-bound of the first histogram slot interval, and slotsize is the interval length of the histogram slots; and output the histogram of the model M.

Computing the Class Model Coefficients

Intuitively, the coefficient of the model (e.g., $k_H$, $k_T$, and $k_B$ shown above) measures the amount of contribution that the information originating from the model provides in determining the fitness of the input with the suggested class interpretation. According to an exemplary embodiment of the present invention, these coefficients can be determined by computing the amount of discrepancy of the distribution, as compared to the same type of the models of different classes. If the discrepancy of a particular model is greater than the discrepancies in other models of the same class, that particular model should provide a larger coefficient. This is because the current model provides more information in measuring the fitness of the input data.

FIG. 24 shows a flow diagram of an exemplary embodiment according to the present invention for ascertaining a distribution discrepancy between two bigram classes. For example, for two bigram classes $T_1$ and $T_2$, and the model M, the distribution discrepancy of the class $T_1$'s model M from the class $T_2$'s model M can be labeled as D(M, $T_1$, $T_2$). The exemplary steps for determining the distribution discrepancy D(M, $T_1$, $T_2$) are as follows:

The scales of distribution of the models M of the respective of bigram classes $T_1$ and $T_2$ are aligned by extending the corresponding histograms $HIST_{T1}$ and $HIST_{T2}$ to $HIST'_{T1}$ and $HIST'_{T2}$, so that $HIST'_{T1}$ and $HIST'_{T2}$ have the same range of intervals as $HIST_{T1}$ and $HIST_{T2}$ (step 850).

The discrepancy DSUM is computed in step 855 as follows (by iterating over i)

$$DSUM := \begin{cases} HIST'_{T_2}[i] - HIST'_{T_1}[i] & \text{if } HIST'_{T_1}[i] < HIST'_{T_2}[i] \\ HIST'_{T_1}[i] - HIST'_{T_2}[i] & \text{else} \end{cases}$$

Then, in step 860, the distribution discrepancy DSUM is output.

It is preferable to utilize step 850 for determining DSUM because the bigram classes $T_1$ and $T_2$ usually have different distributions that correspond to different real value intervals. Thus, for a given class T, $D_M(T)$ can be assigned to be the sum of D(M, T, *)'s over all other classes. This procedure can then be repeated on other models of the bigram classes T. Also, $D_H(T)$, $D_T(T)$ and $D_B(T)$ can be assigned as being the three discrepancy quantities for the respective class T's models $M_H$, $M_T$ and $M_B$, respectively. Then, the coefficients for the respective class T can be as follows:

$$k_H = D_H(T)/(D_H(T) + D_T(T) + D_B(T))$$

$$k_T = D_T(T)/(D_H(T) + D_T(T) + D_B(T))$$

$$k_B = D_B(T)/(D_H(T) + D_T(T) + D_B(T)).$$

The three coefficients are computed for each of the 9 bigram classes, so the total of 27 coefficients are computed for each model of each bigram class, using the above procedure.

One having ordinary skill in the art would clearly recognize that many other applications of the embodiments of the system and process for handwriting recognition according to the present invention. Indeed, the present invention is in no way limited to the exemplary applications and embodiments thereof described above.

What is claimed is:

1. A process for determining a most likely combination of characters, comprising the steps of:
   a) obtaining character data which includes information indicative of at least one handwritten character, the character data including at least one set of segmentation points for the at least one handwritten character; and
   b) providing a score for each particular character of a set of previously stored characters based on a comparison between the character data and the respective stored particular character,
      wherein the at least one handwritten character includes a plurality of handwritten characters, wherein a first character of the handwritten characters is connected to a second character of the handwritten characters via a transition, and further comprising the steps of:
   aa) determining a further score of the transition based on a difference in length of the first character and the second character, wherein step (aa) is determined based on a height difference ratio ($M_H$), a top difference ratio ($M_T$) and a bottom difference ratio ($M_B$) of the first character and the second character; and
   bb) combining the further score with the score corresponding to the particular characters to form a combined score.

2. The process according to claim 1, further comprising the step of:
   c) prior to steps (a) and (b), generating the character data after a user completes entering handwritten characters on an input device.

3. The process according to claim 2, wherein the character data corresponds to a handwritten word.

4. The process according to claim 2, wherein the character data is generated when the user disconnects a writing instrument from the input device.

5. The process according to claim 1, wherein the score is provided for each of the previously stored characters by analyzing a predetermined number of the segmentation points of the character data.

6. The process according to claim 1, wherein the character data includes cursive data corresponding to at least one handwritten cursive character and script data corresponding to at least one handwritten script character.

7. The process according to claim 1, wherein the score for each of the previously stored characters is recorded at predetermined time intervals.

8. The process according to claim 1, wherein the score for a current previously stored character is based on previous scores of a word path associated with a current previously stored character.

9. The process according to claim 8, wherein the score is the average of total scores for the previously stored characters corresponding to the word path.

10. The process according to claim 8, further comprising the step of:
    d) removing the word path from being considered as the most likely combination of characters, the word path corresponding to a characters sequence.

11. The process according to claim 10, wherein step (d) includes the substep of determining whether the character sequence is to be filtered out based on the score associated with the word path of the character sequence.

12. The process according to claim 11, wherein the determining substep is performed based on a total number of the character sequences.

13. The process according to claim 1, further comprising the step of:
    e) normalizing the score, and recording the normalized score in a storage arrangement.

14. The process according to claim 13, wherein step (e) is performed for each of the previously stored characters.

15. The process according to claim 1, wherein the character data corresponds to a sequence of handwritten characters, and further comprising the step of:
    f) determining if the sequence exists in a dictionary.

16. The process according to claim 15, wherein step (f) is performed for each of sequences of a plurality of handwritten characters at predetermined time intervals.

17. The process according to claim 15, wherein the dictionary has a tree-type structure, and wherein step (f) is performed by evaluating whether every character of the sequence is provided at a particular node of the tree-type structure of the dictionary.

18. The process according to claim 15, further comprising the step of:
    g) if the sequence is not in the dictionary, removing the sequence from being considered as the most likely combination of characters.

19. The process according to claim 15, further comprising the step of:
    h) if the sequence is not in the dictionary, arranging the score for the sequence to be at least one of lowered or unchanged.

20. The process according to claim 1, wherein the at least one handwritten character includes a plurality of handwritten characters, wherein a first character of the handwritten characters is connected to a second character of the handwritten characters via a ligature, and further comprising the step of:

i) determining a further score of the ligature based on a starting point of the ligature and an ending point of the ligature.

21. The process according to claim 20, wherein the further score is combined with the score corresponding to the previously stored characters to form a combined score.

22. The process according to claim 1, further comprising the steps of:

j) assigning a vector corresponding to each of the handwritten characters; and k) comparing each of the vectors to recorded vectors which correspond to the previously stored characters.

23. The process according to claim 22, wherein step (k) is performed by applying a Fisher technique to the vectors corresponding to the handwritten characters.

24. The process according to claim 23, further comprising the step of:

l) comparing the vectors corresponding to the handwritten characters to a cluster of vectors corresponding to the previously stored characters.

25. The process according to claim 24, wherein step (l) is performed by measuring a Euclidean distance from the vector corresponding to the handwritten characters to each of the clusters.

26. The process according to claim 25, wherein the Euclidean distance is determined from a center of each of the clusters.

27. The process according to claim 1, wherein each of the previously stored handwritten characters are assigned to at least one of three classes of characters based on vertical extension dimensions thereof.

28. The process according to claim 27, wherein a first class of the three classes includes first characters which extend beyond a predetermined top position, wherein a second class of the three class includes second characters which extend below a predetermined bottom position, and wherein a third class of the three classes includes third characters which do not extend above the predetermined top position or below the predetermined bottom position.

29. The process according to claim 1, wherein the further score (VBScore) is determined according to the following:

$$VBScore(<c_1,c_2>)=k_H \cdot M_H(<c_1,c_2>)+k_T \cdot M_T(<c_1,c_2>)+k_B \cdot M_B(<c_1,c_2>),$$

where $c_1$ is the first character, $c_2$ is the second character, $k_H$ is a height position coefficient, $k_T$ is a top position coefficient, and $k_B$ is a bottom position coefficient.

30. The process according to claim 29, wherein the height, top and bottom position coefficients are estimated.

31. The process according to claim 29, wherein the height, top and bottom position coefficients are the same for each pair of the three classes.

32. The process according to claim 29, further comprising the steps of:

m) generating a histogram for each pair of the three classes; and n) estimating at least one of the height, top and bottom position coefficients based on the histograms.

33. The process according to claim 1, further comprising the step of:

o) prior to steps (a) and (b), segmenting the at least one handwritten character to produce a plurality of segmentation points for the character data.

34. The process according to claim 33, further comprising the step of:

p) adding a further segmentation point between two neighboring segmentation points of the plurality of segmentation points if a Euclidean distance between the two neighboring segmentation points if the Euclidean distance is greater than a predetermined threshold.

35. The process according to claim 33, further comprising the steps of:

q) establishing a segment between two neighboring segmentation points of each pair of the plurality of segmentation points; and r) assigning a predetermined code to each of the segments using a previously stored list of codes.

36. The process according to claim 35, wherein the predetermined code is assigned to each respective segment based on a similarity of a curvature of the respective segment and a list of previously stored extensions.

37. The process according to claim 36, wherein each respective segment is normalized to be comparable with the previously stored extensions.

38. A process for ascertaining one or more particular characters from character data associated with a handwriting, comprising the steps of:

a) obtaining the character data which includes information indicative of at least one handwritten character; and b) comparing visual aspects of the at least one handwritten character to visual aspects of each of previously stored characters to ascertain the one or more particular characters wherein the at least one handwritten character includes a plurality of handwritten characters, wherein a first character of the handwritten characters is connected to a second character of the handwritten characters via a transition, and further comprising the steps of:

aa) providing a score for each of previously stored characters based on a comparison between the character data and the respective previously stored particular character;

bb) determining a further score of the transition based on a difference in length of the first character and the second character, wherein step (bb) is determined based on a height difference ratio ($M_H$), a top difference ratio ($M_T$) and a bottom difference ratio ($M_B$) of the first character and the second character; and cc) combining the further score with the score corresponding to the previously stored characters to form a combined score.

39. The process according to claim 38, wherein the at least one handwritten character includes a plurality of handwritten characters, and wherein step (b) includes comparing at least one of a respective angle and a position of two neighboring characters of the handwritten characters.

40. The process according to claim 38, further comprising the step of:

c) prior to steps (a) and (b), segmenting the at least one handwritten character to produce a plurality of segmentation points for the character data.

41. The process according to claim 40, further comprising the steps of:

d) establishing a segment between two neighboring segmentation points of each pair of the plurality of segmentation points; and e) assigning a predetermined code to each of the segments using a previously stored list of codes.

42. The process according to claim 41, wherein the predetermined code is assigned to each respective segment based on a similarity of a curvature of the respective segment and a list of previously stored extensions.

43. The process according to claim 38, wherein the score is provided for each of the previously stored characters by analyzing the a predetermined number of the segmentation points of the character data.

44. The process according to claim 43, wherein the character data is generated when the user disconnects a writing instruments from the input device.

45. The process according to claim 38, wherein the score for each previously stored character is recorded at a predetermined time intervals.

46. The process according to claim 38, wherein the score for a current previously stored character is based on previous scores of a word path associated with a current previously stored character.

47. The process according to claim 46, wherein the score is an average of total scores for the previously stored characters corresponding to the word path.

48. The process according to claim 38, wherein the character data includes cursive data corresponding to at least one handwritten cursive character and script data corresponding to at least one handwritten script character.

49. The process according to claim 38, further comprising the steps of:
f) assigning a vector corresponding to each of the handwritten characters; and
g) comparing each of the vectors to recorded vectors which correspond to the previously stored characters.

50. The process according to claim 49, further comprising the step of:
h) comparing the vectors corresponding to the handwritten characters to a cluster of vectors corresponding to the previously stored characters.

51. The process according to claim 50, wherein step (h) is performed by measuring a Euclidean distance from the vector corresponding to the handwritten characters to each of the clusters.

52. The process according to claim 51, wherein the Euclidean distance is determined from a center of each of the clusters.

53. The process according to claim 40, wherein each of the previously stored handwritten characters are assigned to at least one of three classes of characters based on vertical extension dimensions thereof.

54. The process according to claim 53, wherein a first class of the three classes includes first characters which extend beyond a predetermined top position, wherein a second class of the three class includes second characters which extend below a predetermined bottom position, and wherein a third class of the three classes includes third characters which do not extend above the predetermined top position or below the predetermined bottom position.

55. The process according to claim 53, wherein the further score (VBScore) is determined according to the following:

$$VBScore(<c_1,c_2>) = k_H \cdot M_H(<c_1,c_2>) + k_T \cdot M_T(<c_1,c_2>) + k_B \cdot M_B(<c_1,c_2>),$$

where $c_1$ is the first character,
$c_2$ is the second character,
$k_H$ is a height position coefficient,
$k_T$ is a top position coefficient, and
$k_B$ is a bottom position coefficient.

56. The process according to claim 55, wherein the height, top and bottom position coefficients are estimated.

57. The process according to claim 55, wherein the height, top and bottom position coefficients are the same for each pair of the three classes.

58. The process according to claim 57, further comprising the steps of:
i) generating a histogram for each pair of the three classes; and
j) estimating at least one of the height, top and bottom position coefficients based on the histograms.

59. The process according to claim 38, further comprising the step of:
k) prior to steps (a) and (b), segmenting the at least one handwritten character to produce a plurality of segmentation points for the character data.

60. The process according to claim 59, further comprising the step of:
l) adding a further segmentation point between two neighboring segmentation points of the plurality of segmentation points if a Euclidean distance between the two neighboring segmentation points is greater than a predetermined threshold.

61. The process according to claim 59, further comprising the steps of:
m) establishing a segment between two neighboring segmentation points of each pair of the plurality of segmentation points; and
n) assigning a predetermined code to each of the segments using a previously stored list of codes.

62. The process according to claim 61, wherein the predetermined code is assigned to each respective segment based on a similarity of a curvature of the respective segment and a list of previously stored extensions.

63. The process according to claim 62, wherein each respective segment is normalized to be comparable with the previously stored extensions.

64. The process according to claim 38, further comprising the step of:
o) performing a training procedure to obtain at least two variations of the same character.

65. The process according to claim 64, wherein step (of) is performed using a Fisher technique.

66. A process for ascertaining one or more particular characters from character data associated with a handwriting, comprising the steps of:
a) obtaining the character data which includes information indicative of at least one handwritten character; and
b) applying a Fisher Matching procedure on the character data to ascertain the one or more particular characters, wherein the at least one handwritten character includes a plurality of handwritten characters, wherein a first character of the handwritten characters is connected to a second character of the handwritten characters via a transition, and further comprising the steps of:
c) providing a score for each of previously stored characters based on a comparison between the character data and the respective previously stored particular character;
d) determining a further score of the transition based on a difference in length of the first character and the second character, wherein step (bb) is determined based on a height difference ratio ($M_H$), a top difference ratio ($M_T$) and a bottom difference ratio ($M_B$) of the first character and the second character; and e) combining the further score with the score corresponding to the previously stored characters to form a combined score.

67. A process for ascertaining at least one particular character from character data associated with a handwriting, comprising the steps of:
   a) obtaining the character data associated with handwritten characters, a first character of the handwritten characters being connected to a second character of the handwritten characters via a ligature; and
   b) determining a first score of the ligature based on a start point of the ligature and an end point of the ligature, wherein the at least one handwritten character includes a plurality of handwritten characters, wherein a first character of the handwritten characters is connected to a second character of the handwritten characters via a transition, and further comprising the steps of:
   c) providing a second score for each of previously stored characters based on a comparison between the character data and the respective previously stored particular character;
   d) determining a third score of the transition based on a difference in length of the first character and the second character, wherein step (bb) is determined based on a height difference ratio ($M_H$), a top difference ratio ($M_T$) and a bottom difference ratio ($M_B$) of the first character and the second character; and
   e) combining the third score with the second score corresponding to the previously stored characters to form a combined score.

68. The process according to claim 67, further comprising the steps of:
   c) assigning a vector corresponding to each of the handwritten characters; and
   d) comparing each of the vectors to recorded vectors which correspond to previously stored characters.

69. The process according to claim 68, wherein step (d) is performed by applying a Fisher technique to the vectors corresponding to the handwritten characters.

70. The process according to claim 69, further comprising the step of:
   e) comparing the vectors corresponding to the handwritten characters to a cluster of vectors corresponding to the previously stored characters.

71. The process according to claim 70, wherein step (e) is performed by measuring a Euclidean distance from the vector corresponding to the handwritten characters to each of the clusters.

72. The process according to claim 71, wherein the Euclidean distance is determined from a center of each of the clusters.

73. A process for ascertaining at least one particular handwritten character from character data associated with handwritten characters, comprising the steps of:
   a) obtaining the character data, wherein a first character of the handwritten characters is connected to a second character of the handwritten characters via a transition;
   b) determining a particular score of the transition based on a difference in length of the first character and the second character, wherein step (b) is determined based on a height difference ratio ($M_H$), a top difference ratio ($M_T$) and a bottom difference ratio ($M_B$) of the first character and the second character;
   c) combining the particular score with a score corresponding to the handwritten characters to form a combined score; and
   d) assigning each of previously stored handwritten characters to at least one of three classes of characters based on vertical extension dimensions thereof,
      wherein a first class of the three classes includes first characters which extend beyond a predetermined top position, wherein a second class of the three class includes second characters which extend below a predetermined bottom position, and wherein a third class of the three classes includes third characters which do not extend above the predetermined top position or below the predetermined bottom position.

74. A process for ascertaining at least one particular handwritten character from character data associated with handwritten characters, comprising the steps of:
   a) obtaining the character data, wherein a first character of the handwritten characters is connected to a second character of the handwritten characters via a transition;
   b) determining a particular score of the transition based on a difference in length of the first character and the second character, wherein step (b) is determined based on a height difference ratio ($M_H$), a top difference ratio ($M_T$) and a bottom difference ratio ($M_B$) of the first character and the second character; and
   c) combining the particular score with a score corresponding to the handwritten characters to form a combined score,
   wherein the particular score (VBScore) is determined according to the following:

$$VBScore(<c_1,c_2>) = k_H \cdot M_H(<c_1,c_2>) + k_T \cdot M_T(<c_1,c_2>) + k_B \cdot M_B(<c_1,c_2>),$$

where $c_1$ is the first character,
   $c_2$ is the second character,
   $k_H$ is a height position coefficient,
   $k_T$ is a top position coefficient, and
   $k_B$ is a bottom position coefficient.

75. The process according to claim 74, wherein the height, top and bottom position coefficients are estimated.

76. The process according to claim 74, wherein the height, top and bottom position coefficients are the same for each pair of the three classes.

77. The process according to claim 74, further comprising the steps of:
   e) generating a histogram for each pair of the three classes; and
   f) estimating at least one of the height, top and bottom position coefficients based on the histograms.

78. A software system which, when executed on a processing device, configures the processing device to determine a most likely combination of characters, the software system comprising:
   a processing subsystem which, when executed on the processing device, configures the processing device to perform the following:
   a) obtain character data which includes information indicative of at least one handwritten character, the character data including at least one set of segmentation points for the at least one handwritten character,
   b) provide a score for each particular character of a set of previously stored characters based on a comparison between the character data and the respective previously stored particular character, wherein the at least one handwritten character includes a plurality of handwritten characters, wherein a first character of the handwritten characters is connected to a second character of the handwritten characters via a transition, c) determine a further score of the transition based on a difference in length of the first character and the second character, wherein step (c) is determined based on a height difference ratio ($M_H$), a top difference ratio ($M_T$) and a bottom difference ratio ($M_B$) of the first character and the second character, and d) combine the further score with the score corresponding to the particular characters to form a combined score.

79. The software system according to claim 78, wherein, when executed on the processing device, the processing subsystem is capable of generating the character data after a user completes entering handwritten characters on an input device.

80. The software system according to claim 79, wherein the character data corresponds to a handwritten word.

81. The software system according to claim 79, wherein the score is provided for each of the previously stored characters by analyzing a predetermined number of the segmentation points of the character data.

82. The software system according to claim 79, wherein the character data is generated when the user disconnects a writing instrument from the input device.

83. The software system according to claim 78, wherein the character data includes cursive data corresponding to at least one handwritten cursive character and script data corresponding to at least one handwritten script character.

84. The software system according to claim 78, wherein the score for each of the previously stored characters is recorded at predetermined time intervals.

85. The software system according to claim 78, wherein the score for a current previously stored character is based on previous scores of a word path associated with a current previously stored character.

86. The software system according to claim 85, wherein the score is the average of total scores for the previously stored characters corresponding to the word path.

87. The software system according to claim 85, wherein, when in operation, the processing subsystem is configured to remove the word path from being considered as the most likely combination of characters, the word path corresponding to a characters sequence.

88. The software system according to claim 87, wherein, when in operation, the processing subsystem is configured to determines whether the character sequence is to be filtered out based on the score associated with the word path of the character sequence.

89. The software system according to claim 88, wherein, when in operation, the processing subsystem is configured to make the determination regarding the character sequences based on a total number of the character sequences.

90. The software system according to claim 78, wherein, when in operation, the processing subsystem is configured to normalize the score, and record the normalized score in a storage arrangement.

91. The software system according to claim 78, wherein the character data corresponds to a sequence of handwritten characters, and wherein, when in operation, the processing subsystem is configured to determine if the sequence exists in a dictionary.

92. The software system according to claim 91, wherein the determination regarding the existence of the sequence is performed for each of sequences of a plurality of handwritten characters at predetermined time intervals.

93. The software system according to claim 91, wherein the dictionary has a tree-type structure, and wherein the determination regarding the existence of the sequence is performed by evaluating whether every character of the sequence is provided at a particular node of the tree-type structure of the dictionary.

94. The software system according to claim 91, wherein, when in operation, the processing subsystem is configured to remove the sequence from being considered as the most likely combination of characters if the sequence is not in the dictionary.

95. The software system according to claim 91, wherein, when in operation, the processing subsystem is configured to arrange the score for the sequence to be at least one of lowered or unchanged if the sequence is not in the dictionary.

96. The software system according to claim 95, wherein the further score is combined with the score corresponding to the previously stored characters to form a combined score.

97. The software system according to claim 78, wherein the at least one handwritten character includes a plurality of handwritten characters, wherein a first character of the handwritten characters is connected to a second character of the handwritten characters via a ligature, and wherein, when in operation, the processing subsystem is configured to determine the further score of the ligature based on a starting point of the ligature and an ending point of the ligature.

98. The software system according to claim 78, wherein, when in operation, the processing subsystem is configured to:

e) assign a vector corresponding to each of handwritten characters, and f) compare each of the vectors to recorded vectors which correspond to the previously stored characters.

99. The software system according to claim 98, wherein the comparison is performed by applying a Fisher technique to the vectors corresponding to the handwritten characters.

100. The software system according to claim 99, wherein, when in operation, the processing subsystem is configured to compare the vectors corresponding to the handwritten characters to a cluster of vectors corresponding to the previously stored characters.

101. The software system according to claim 100, wherein the comparison of the vectors is performed by measuring a Euclidean distance from the vector corresponding to the handwritten characters to each of the clusters.

102. The software system according to claim 101, wherein the Euclidean distance is determined from a center of each of the clusters.

103. The software system according to claim 78, wherein each of the previously stored handwritten characters are assigned to at least one of three classes of characters based on vertical extension dimensions thereof.

104. The software system according to claim 103, wherein a first class of the three classes includes first characters which extend beyond a predetermined top position, wherein a second class of the three class includes second characters which extend below a predetermined bottom position, and wherein a third class of the three classes includes third characters which do not extend above the predetermined top position or below the predetermined bottom position.

105. The software system according to claim 78, wherein the further score (VBScore) is determined according to the following:

$$VBScore(<c_1,c_2>) = k_H \cdot M_H(<c_1,c_2>) + k_T \cdot M_T(<c_1,c_2>) + k_B \cdot M_B(<c_1,c_2>),$$

where $c_1$ is the first character,
$c_2$ is the second character,
$k_H$ is a height position coefficient,
$k_T$ is a top position coefficient, and
$k_B$ is a bottom position coefficient.

106. The software system according to claim 105, wherein the height, top and bottom position coefficients are estimated.

107. The software system according to claim 105, wherein the height, top and bottom position coefficients are the same for each pair of the three classes.

108. The software system according to claim 105, wherein, when in operation, the processing subsystem is configured to:
g) generate a histogram for each pair of the three classes, and
h) estimate at least one of the height, top and bottom position coefficients based on the histograms.

109. The software system according to claim 78, wherein, when in operation, the processing subsystem is configured to segment the at least one particular character to produce a plurality of segmentation points for the character data.

110. The software system according to claim 109, wherein, when in operation, the processing subsystem is configured to add a further segmentation point between two neighboring segmentation points of the plurality of segmentation points if a Euclidean distance between the two neighboring segmentation points is greater than a predetermined threshold.

111. The software system according to claim 109, wherein, when in operation, the processing subsystem is configured to:
j) establish a segment between two neighboring segmentation points of each pair of the plurality of segmentation points and
k) assign a predetermined code to each of the segments using a previously stored list of codes.

112. The software system according to claim 111, wherein the predetermined code is assigned to each respective segment based on a similarity of a curvature of the respective segment and a list of previously stored extensions.

113. The software system according to claim 112, wherein each respective segment is normalized to be comparable with the previously stored extensions.

114. A software system which, when executed on a processing device, configures the processing device to ascertain one or more particular characters from character data associated with a handwriting, the software system comprising:
a processing subsystem which, when executed on the processing device, configures the processing device to perform the following steps:
a) obtain the character data which includes information indicative of at least one handwritten character,
b) compare visual aspects of the at least one handwritten character to visual aspects of each of previously stored characters to ascertain the one or more particular characters, wherein the at least one handwritten character includes a plurality of handwritten characters, wherein a first character of the handwritten characters is connected to a second character of the handwritten characters via a transition,
c) provide a score for each of previously stored characters based on a comparison between the character data and the respective previously stored particular character,
d) determine a further score of the transition based on a difference in length of the first character and the second character, wherein step (bb) is determined based on a height difference ratio ($M_H$), a top difference ratio ($M_T$) and a bottom difference ratio ($M_B$) of the first character and the second character, and
e) combine the further score with the score corresponding to the previously stored characters to form a combined score.

115. A software system which, when executed on a processing device, configures the processing device to ascertain one or more particular characters from character data associated with a handwriting, the software system comprising:
a processing subsystem which, when executed on the processing device, configures the processing device to perform the following steps:
a) obtain the character data which includes information indicative of at least one handwritten character,
b) apply a Fisher Matching procedure on the character data to ascertain the one or more particular characters, wherein the at least one handwritten character includes a plurality of handwritten characters, wherein a first character of the handwritten characters is connected to a second character of the handwritten characters via a transition,
c) provide a score for each of previously stored characters based on a comparison between the character data and the respective previously stored particular character,
d) determine a further score of the transition based on a difference in length of the first character and the second character, wherein step (bb) is determined based on a height difference ratio ($M_H$), a top difference ratio ($M_T$) and a bottom difference ratio ($M_B$) of the first character and the second character, and
e) combining the further score with the score corresponding to the previously stored characters to form a combined score.

116. A software system which, when executed on a processing device, configures the processing device to ascertain at least one particular character from character data associated with handwritten characters, the software system comprising:
a processing subsystem which, when executed on the processing device, configures the processing device to perform the following steps:
a) obtain the character data associated with handwritten characters, a first character of the handwritten characters being connected to a second character of the handwritten characters via a ligature,
b) determine a first score of the ligature based on a starting point of the ligature and an ending point of the ligature, wherein the at least one handwritten character includes a plurality of handwritten characters, wherein a first character of the handwritten characters is connected to a second character of the handwritten characters via a transition,
c) provide a second score for each of previously stored characters based on a comparison between the character data and the respective previously stored particular character, d) determine a third score of the transition based on a difference in length of the first character and the second character, wherein step (bb) is determined based on a height difference ratio ($M_H$), a top difference ratio ($M_T$) and a bottom difference ratio ($M_B$) of the first character and the second character; and e) combine the third score with the second score corresponding to the previously stored characters to form a combined score.

117. A software system which, when executed on a processing device, configures the processing device to ascertain at least one particular handwritten character from character data associated with handwritten characters, the software system comprising:

a processing subsystem which, when executed on the processing device, configures the processing device to perform the following steps:

a) obtain the character data, wherein a first character of the handwritten characters is connected to a second character of the handwritten characters via a transition, b) determine a particular score of the transition based on a difference in length of the first character and the second character, wherein step (b) is determined based on a height difference ratio ($M_H$), a top difference ratio ($M_T$) and a bottom difference ratio ($M_B$) of the first character and the second character, c) combine the particular score with a score corresponding to the particular handwritten characters to form a combined score; and d) assigning each of previously stored handwritten characters to at least one of three classes of characters based on vertical extension dimensions thereof, wherein a first class of the three classes includes first characters which extend beyond a predetermined top position, wherein a second class of the three class includes second characters which extend below a predetermined bottom position, and wherein a third class of the three classes includes third characters which do not extend above the predetermined top position or below the predetermined bottom position.

118. A software system which, when executed on a processing device, configures the processing device to ascertain at least one particular handwritten character from character data associated with handwritten characters, the software system comprising:

a processing subsystem which, when executed on the processing device, configures the processing device to perform the following steps:

a) obtain the character data, wherein a first character of the handwritten characters is connected to a second character of the handwritten characters via a transition, b) determine a particular score of the transition based on a difference in length of the first character and the second character, wherein step (b) is determined based on a height difference ratio ($M_H$), a top difference ratio ($M_T$) and a bottom difference ratio ($M_B$) of the first character and the second character, and c) combine the particular score with a score corresponding to the particular handwritten characters to form a combined score, wherein the particular score (VBScore) is determined according to the following:

$$VBScore(<c_1,c_2>) = k_H \cdot M_H(<c_1,c_2>) + k_T \cdot M_T(<c_1,c_2>) + k_B \cdot M_B(<c_1,c_2>),$$

where $c_1$ is the first character,
$c_2$ is the second character,
$k_H$ is a height position coefficient,
$k_T$ is a top position coefficient, and
$k_B$ is a bottom position coefficient.

* * * * *